(12) United States Patent
Tripathi et al.

(10) Patent No.: US 11,388,621 B2
(45) Date of Patent: Jul. 12, 2022

(54) FLEXIBLE HIGH CAPACITY-RADIO NETWORK TEMPORARY IDENTIFIER

(71) Applicant: Samsung Electronics Co., Ltd., Suwon-si (KR)

(72) Inventors: Nishith D. Tripathi, Parker, TX (US); Hongbo Si, Plano, TX (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 17/093,319

(22) Filed: Nov. 9, 2020

(65) Prior Publication Data

US 2021/0144581 A1 May 13, 2021

Related U.S. Application Data

(60) Provisional application No. 62/934,076, filed on Nov. 12, 2019, provisional application No. 62/937,919, (Continued)

(51) Int. Cl.
*H04W 28/02* (2009.01)
*H04W 74/08* (2009.01)
(Continued)

(52) U.S. Cl.
CPC ....... *H04W 28/0268* (2013.01); *H04L 1/1812* (2013.01); *H04W 8/24* (2013.01); (Continued)

(58) Field of Classification Search
CPC ............ H04W 28/02; H04W 28/0268; H04W 28/0273; H04W 74/08; H04W 74/0833; (Continued)

(56) References Cited

U.S. PATENT DOCUMENTS

2013/0258938 A1* 10/2013 Sagfors ................. H04W 72/02
370/312
2015/0043455 A1 2/2015 Miklos et al.
(Continued)

FOREIGN PATENT DOCUMENTS

| CN | WO2017024811 | * | 2/2017 | ............ H04W 24/04 |
| CN | WO2019062360 | * | 4/2019 | ............ H04W 72/04 |
| KR | 20220005506 | * | 1/2022 | ............ H04W 72/04 |

OTHER PUBLICATIONS

"3rd Generation Partnership Project; Technical Specification Group Radio Access Network; NR; Radio Resource Control (RRC) protocol specification (Release 15)", 3GPP TS 38.331 V15.4.0, Dec. 2018, 474 pages.
(Continued)

*Primary Examiner* — Warner Wong

(57) ABSTRACT

Methods and apparatuses in a wireless communication system. A method of operating a base station (BS) includes generating an indicator indicating that the BS is capable of supporting a high-capacity radio network temporary identifier (HC-RNTI), wherein a size of the HC-RNTI is based on a configurable granularity; generating a system information block including the indicator and information indicating the size of the HC-RNTI; transmitting, to a user equipment (UE), the system information block; and transmitting, to the UE, the HC-RNTI, wherein the HC-RNTI is allocated to the UE.

20 Claims, 17 Drawing Sheets

Related U.S. Application Data filed on Nov. 20, 2019, provisional application No. 62/939,096, filed on Nov. 22, 2019, provisional application No. 63/030,075, filed on May 26, 2020, provisional application No. 63/056,280, filed on Jul. 24, 2020, provisional application No. 63/056,308, filed on Jul. 24, 2020.

(51) Int. Cl.
```
H04W 8/24      (2009.01)
H04L 1/18      (2006.01)
H04W 76/27     (2018.01)
H04W 36/22     (2009.01)
H04W 72/12     (2009.01)
H04W 76/11     (2018.01)
```

(52) U.S. Cl.
CPC ....... *H04W 36/22* (2013.01); *H04W 72/1289* (2013.01); *H04W 74/0833* (2013.01); *H04W 76/27* (2018.02); *H04W 76/11* (2018.02)

(58) Field of Classification Search
CPC ......... H04W 8/22; H04W 8/24; H04W 76/00; H04W 76/19; H04W 76/27; H04W 36/00; H04W 36/16; H04W 36/22; H04W 72/1278; H04W 72/1289; H04W 76/11; H04W 28/06; H04W 72/00; H04W 72/04; H04W 72/0486; H04L 63/0414; H04L 2209/20; H04L 61/20

See application file for complete search history.

(56) References Cited

U.S. PATENT DOCUMENTS

| | | |
|---|---|---|
| 2017/0019930 A1 | 1/2017 | Lee et al. |
| 2017/0164250 A1* | 6/2017 | Kim ...................... H04W 88/02 |
| 2019/0014562 A1* | 1/2019 | Yasukawa ............. H04W 28/06 |
| 2019/0394707 A1* | 12/2019 | Wong ................... H04W 68/005 |
| 2020/0100172 A1* | 3/2020 | Wang .................... H04W 48/16 |

OTHER PUBLICATIONS

Qualcomm Incorporated, "Introduction of Rel-16 eMTC enhancements" Change Request, 3GPP TSG-RAN2 Meeting #18, Nov. 18-22, 2019, R2-1915717, 306 pages.

LG Electronics, "Report of Email discussion [106#65][R16 eMTC] UE identifier pros and cons", 3GPP TSG-RAN WG2 Meeting #108, Nov. 18-22, 2019, R2-1915949, 11 pages.

Ericsson, "Definition of NR Standalone", Change Request, 3GPP TSG-RAN2 Meeting #108, Nov. 18-22, 2019, R2-1915673, 26 pages.

International Search Report dated Feb. 18, 2021 in connection with International Patent Application No. PCT/KR2020/015803, 3 pages.

* cited by examiner

FLEXIBLE HIGH CAPACITY-RADIO NETWORK TEMPORARY IDENTIFIER

CROSS-REFERENCE TO RELATED APPLICATIONS AND CLAIM OF PRIORITY

The present application claims priority to:
U.S. Provisional Patent Application No. 62/934,076, filed on Nov. 12, 2019;
U.S. Provisional Patent Application No. 62/937,919, filed on Nov. 20, 2019;
U.S. Provisional Patent Application No. 62/939,096, filed on Nov. 22, 2019;
U.S. Provisional Patent Application No. 63/030,075, filed on May 26, 2020;
U.S. Provisional Patent Application No. 63/056,280, filed on Jul. 24, 2020; and
U.S. Provisional Patent Application No. 63/056,308, filed on Jul. 24, 2020. The content of the above-identified patent document is incorporated herein by reference.

TECHNICAL FIELD

The present disclosure relates generally to a radio network temporary identifier and, more specifically, the present disclosure relates to a flexible high capacity-radio network temporary identifier that is highly beneficial for delay tolerant services and/or for large cells with high capacity requirements per cell.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

The present disclosure generally relates to a radio network temporary identifier and, more specifically, the present disclosure relates to a flexible high capacity-radio network temporary identifier that is highly beneficial for delay tolerant services and/or for large cells with high capacity requirements per cell.

In one embodiment, a base station (BS) in a wireless communication system is provided. The BS comprises a processor configured to: generate an indicator indicating that the BS is capable of supporting a high-capacity radio network temporary identifier (HC-RNTI), wherein a size of the HC-RNTI is based on a configurable granularity; and generate a system information block including the indicator and information indicating the size of the HC-RNTI. The BS further comprises a transceiver operably connected to the processor, the transceiver configured to: transmit, to a user equipment (UE), the system information block; and transmit, to the UE, the HC-RNTI, wherein the HC-RNTI is allocated to the UE.

In another embodiment, a UE in a wireless communication system is provided. The UE comprises a transceiver configured to receive, from a BS, a system information block including an indicator and information indicating a size of an HC-RNTI, wherein the size of the HC-RNTI is based on a configurable granularity. The UE further comprises a processor operably connected to the transceiver, the processor configured to identify the indicator indicating that the BS is capable of supporting the HC-RNTI, and the size of the HC-RNTI. The transceiver of the UE is further configured to receive, from the BS, the HC-RNTI, wherein the HC-RNTI is allocated to the UE.

In yet another embodiment, a method of a BS a wireless communication system is provided. The method comprises: generating an indicator indicating that the BS is capable of supporting an HC-RNTI, wherein a size of the HC-RNTI is based on a configurable granularity; generating a system information block including the indicator and information indicating the size of the HC-RNTI; transmitting, to a UE, the system information block; and transmitting, to the UE, the HC-RNTI, wherein the HC-RNTI is allocated to the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, a reference is now made to the following description taken in conjunction with the accompanying drawings, in which like reference numerals represent like parts.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
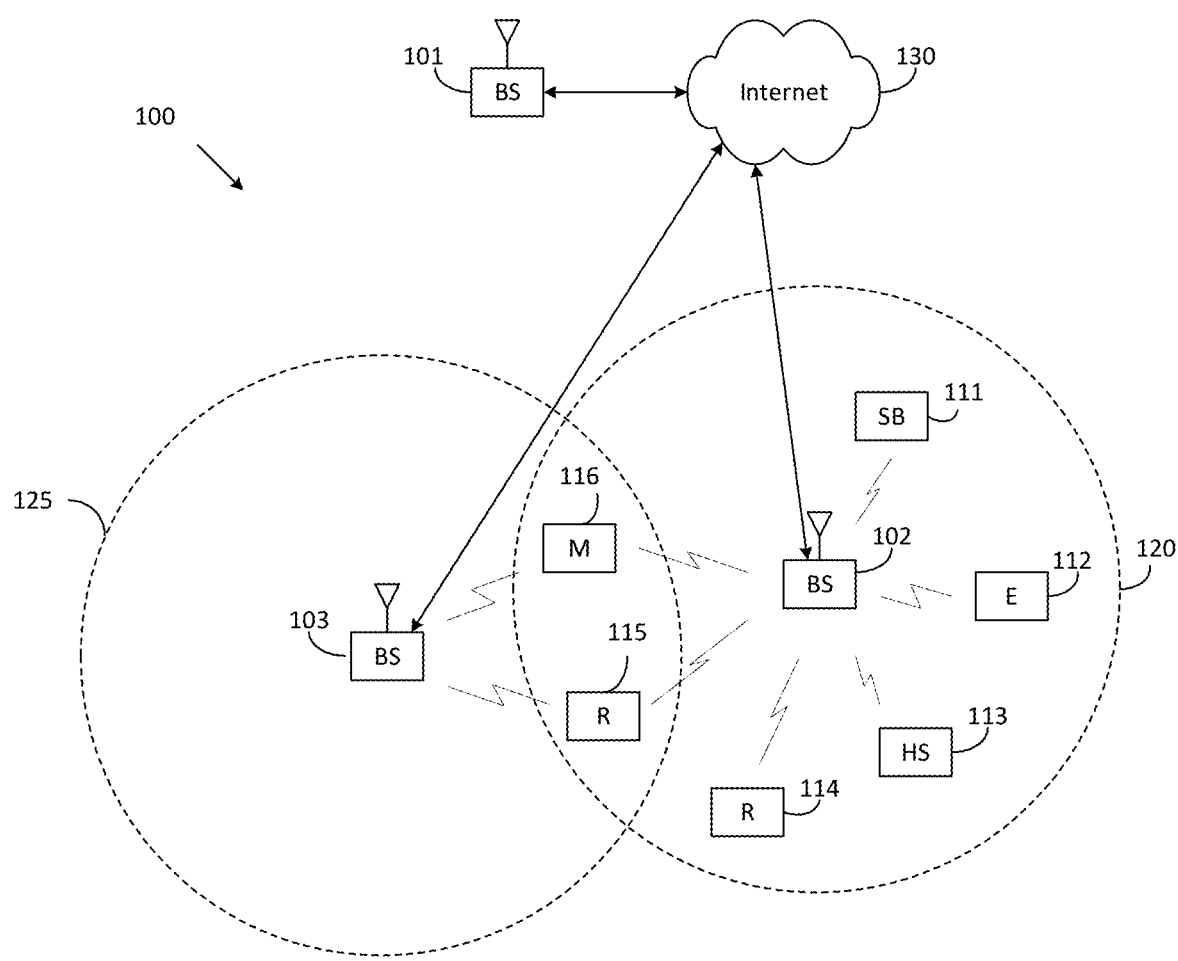
FIG. 1 illustrates an example wireless network according to embodiments of the present disclosure.
Figure 2:
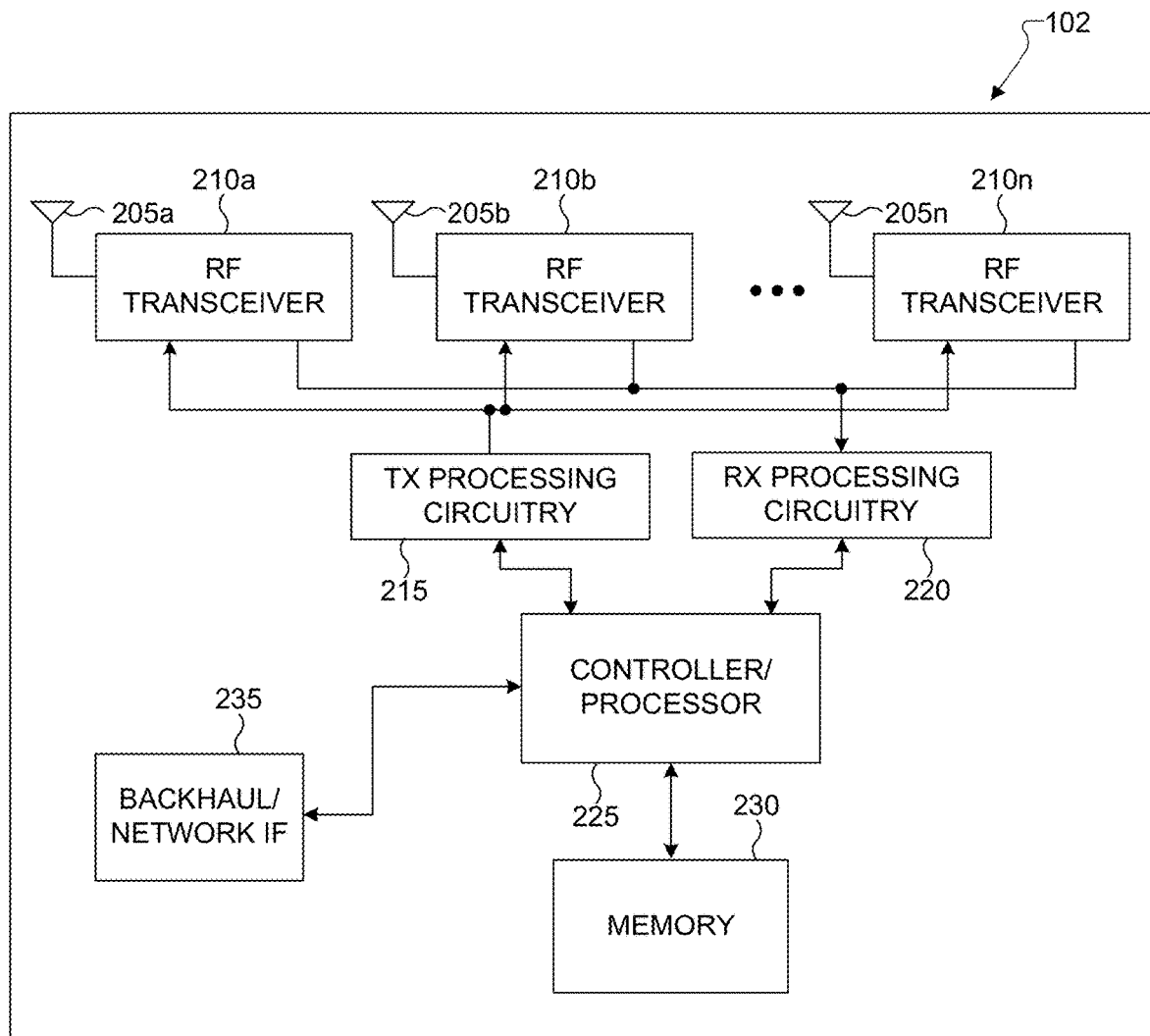
FIG. 2 illustrates an example gNB according to embodiments of the present disclosure.
Figure 3:
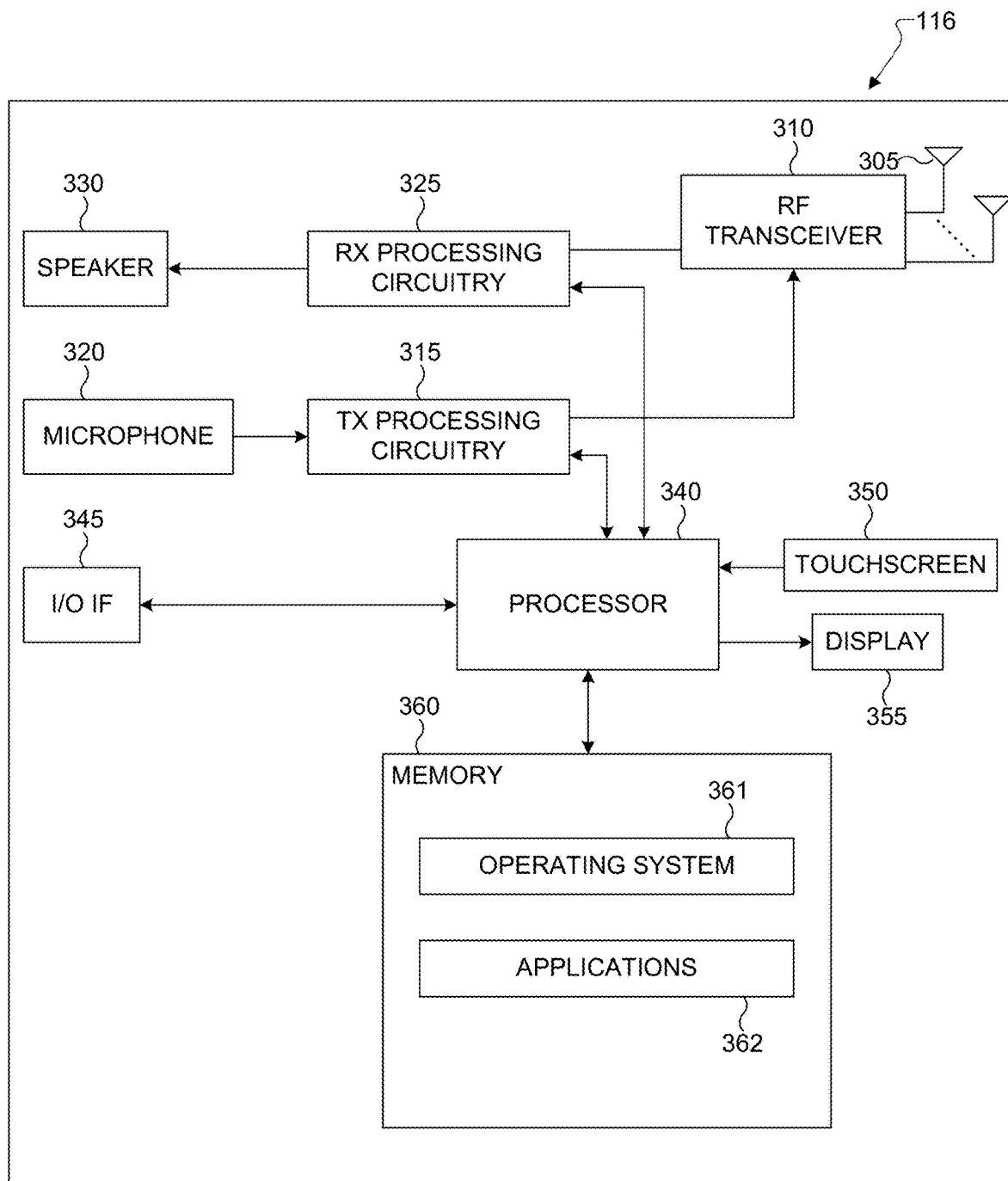
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE"

can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for UEs. In certain embodiments, and one or more of the gNBs 101-103 includes circuitry, programming, or a combination thereof for UEs.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used.

For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

This disclosure provides a new flexible structure for the dedicated radio network temporary identifier (RNTI) to efficiently support a massive number of simultaneous radio connections in a given cell. This UE identifier is referred to as an HC-RNTI. With the wireless networks being virtualized, cloud-based computing and storage resources would facilitate implementation of eNBs/gNBs capable of supporting hundreds of thousands of active connections. As the required number of supportable RRC connections increases or decreases, the network can dynamically change the HC-RNTI size and allocate HC-RNTIs (with a newer size) to new RRC connections. The gNB/eNB can, without an artificial fixed-size RNTI constraint, decide whether to keep a given UE in RRC_CONNECTED mode or incur signaling costs of RRC state transitions.

In a typical LTE or 5G network, a UE is assigned one or more dedicated RNTIs (e.g., cell-RNTI) that remain valid for the duration of the dedicated RRC signaling connection between the UE and a cell (or sector) of the radio network when the UE is in the RRC_CONNECTED state. In deployment scenarios where a large number of UEs have RRC connections with a given cell, the constraint of only 16 bits as the RNTI size limits the number of devices that can be in the RRC_CONNECTED state, leading to a huge increase in the signaling load and processing load due to frequent state transitions between the RRC_CONNECTED state and other RRC states such as RRC_INACTIVE or RRC_IDLE.

In particular, the signaling load becomes excessive and highly inefficient when the cells are large (i.e., covering more devices), an amount of traffic is low (e.g., less than few hundred bytes), and the frequency of data transmission is intermittent (e.g., every few seconds, minutes, or hours). Example scenarios where the existing 16-bit RNTI would be a capacity bottleneck include massive delay-tolerant IoT, emergency communications, and maritime communications.

If the RNTI size is kept at 16 bits, the maximum number of distinct RRC connections that can be supported simultaneously is restricted to about 65,000 (i.e., $2^{16}=65,536$). Hence, once 65,000 RRC connections have been established, any new requests for radio connections may be blocked or state transitions from RRC_CONNECTED to RRC_IDLE or RRC_INACTIVE for suitable devices may be carried out to accommodate new requests. State transitions may also be carried out by the eNB/gNB in the normal course of operations such as at the expiry of an inactivity timer. Depending upon target use cases and the cell sizes, the capacity limit of 65,000 imposed by the fixed 16-bit RNTI may not suffice.

In particular, IoT devices are expected to grow significantly in the coming years for different verticals such as agriculture, energy, and transportation, and a flexible HC-RNTI would facilitate support for a massive number of low-rate delay-tolerant services.

The HC-RNTI can be viewed as a flexible and enhanced version of RNTI, especially cell-RNTI (C-RNTI) but not limited to C-RNTI. This disclosure introduces the HC-RNTI concept and describes the mechanisms that can be enhanced to support such RNTI flexibility and enhancement.

To maintain backward compatibility and to simplify the UE and network processing, two or more RNTI sizes are envisioned: (i) the traditional 16-bit RNTI and (ii) one or more larger and flexible HC-RNTI.

Traditional eNBs and gNBs support several hundred or a couple of thousands of active RRC connections. To efficiently support a massive number of low-rate and delay-tolerant services along with traditional smartphones, a paradigm shift is needed; each relevant cell needs to have massive processing capability. With the wireless networks being virtualized, cloud-based computing and storage resources would facilitate implementation of eNBs/gNBs capable of supporting hundreds of thousands of active connections.

In the present disclosure, one or multiple approaches described below can be implemented to realize the concept of flexible HC-RNTI and to facilitate the support for a massive number of delay-tolerant connections. A geosynchronous equatorial orbit (GEO) satellite and high-altitude platform station (HAPS) with a fixed cell on earth are good candidates to support a massive number of delay-tolerant devices and Apps.

For the non terrestrial network (NTN) architecture, several embodiments are available. In one embodiment, a transparent GEO satellite payload can be used, where all the radio protocol stack processing is done at the ground-based eNB or gNB. Such eNB or gNB can make use of high-performance monolithic resources or cloud-based processing and memory resources (e.g., compute resources and storage resources of a cloud network).

In one embodiment, for the NTN architecture, the gNB-distributed unit (gNB-DU) can be on the satellite and the gNB-centralized unit (gNB-CU) can be on the ground. In such case, the gNB-CU can control the amount of data being sent to the gNB-DU based on gNB-DU memory capabilities. In an implementation-specific manner, the gNB-CU can take care most of the storage (e.g., at the packet data convergence protocol (PDCP) layer) to alleviate any significant memory requirements on the gNB-DU.

For radio resource allocation, multiple embodiments can be envisioned. In the aforementioned embodiment, a dynamic scheduling can be used to allocate resources to NTN UEs using HC-RNTI.

In the aforementioned embodiment, for resource allocation, which would reduce the amount of PDCCH signaling, a configured scheduling can be used for NTN UEs using HC-RNTI.

To reduce the impact of longer RRC connections on the UE's battery life, long discontinuous reception (DRX) cycles can be configured for suitable devices to minimize power consumption for any network-originated traffic.

In one embodiment, to save the device battery power, suitable CSI and mobility related measurement configuration can be selected for devices.

A UE is assigned a temporary RNTI during the random access procedure (called temporary C-RNTI in LTE and 5G) and such RNTI can be HC-RNTI when the network supports HC-RNTI or the typical 16-bit RNTI.

In one embodiment, the network can simply convey HC-RNTI to the device without any indication on the support for HC-RNTI or the HC-RNTI size in system information.

If the system information broadcasts the HC-RNTI size that can be expected by new RRC connections at this time, UEs requiring RRC connections can potentially use this information to determine the size of RNTI present in a response message from the gNB/eNB such as random access response message.

Once an HC-RNTI is allocated to the UE in a given cell, the UE can continue to use the HC-RNTI during the lifetime of the UE's RRC connection regardless of the size of the HC-RNTI unless the network reallocates a different HC-RNTI.

As the required number of supportable RRC connections increases or decreases, the network can dynamically change the advertised HC-RNTI size (if any) and allocate an HC-RNTI with a newer size to new RRC connections.

The existing signaling mechanisms in the standard can be enhanced to indicate the new HC-RNTI.

When HC-RNTI is used, suitable adjustments to the access stratum (AS) security mechanisms are made.

Due to the flexibility of HC-RNTI, the gNB/eNB is no longer forced to ask UEs to enter RRC_IDLE or RRC_INACTIVE state. For a given UE, the gNB/eNB can evaluate operational characteristics of UE data traffic (e.g., short message services (SMSs), frequent IoT data transfer, and infrequent data transfer) to determine the most optimal way of utilizing radio resources. The gNB/eNB can, without an artificial RNTI size constraint, decide whether to keep a given UE in RRC_CONNECTED mode or incur signaling costs of RRC state transitions.

Figure 4:
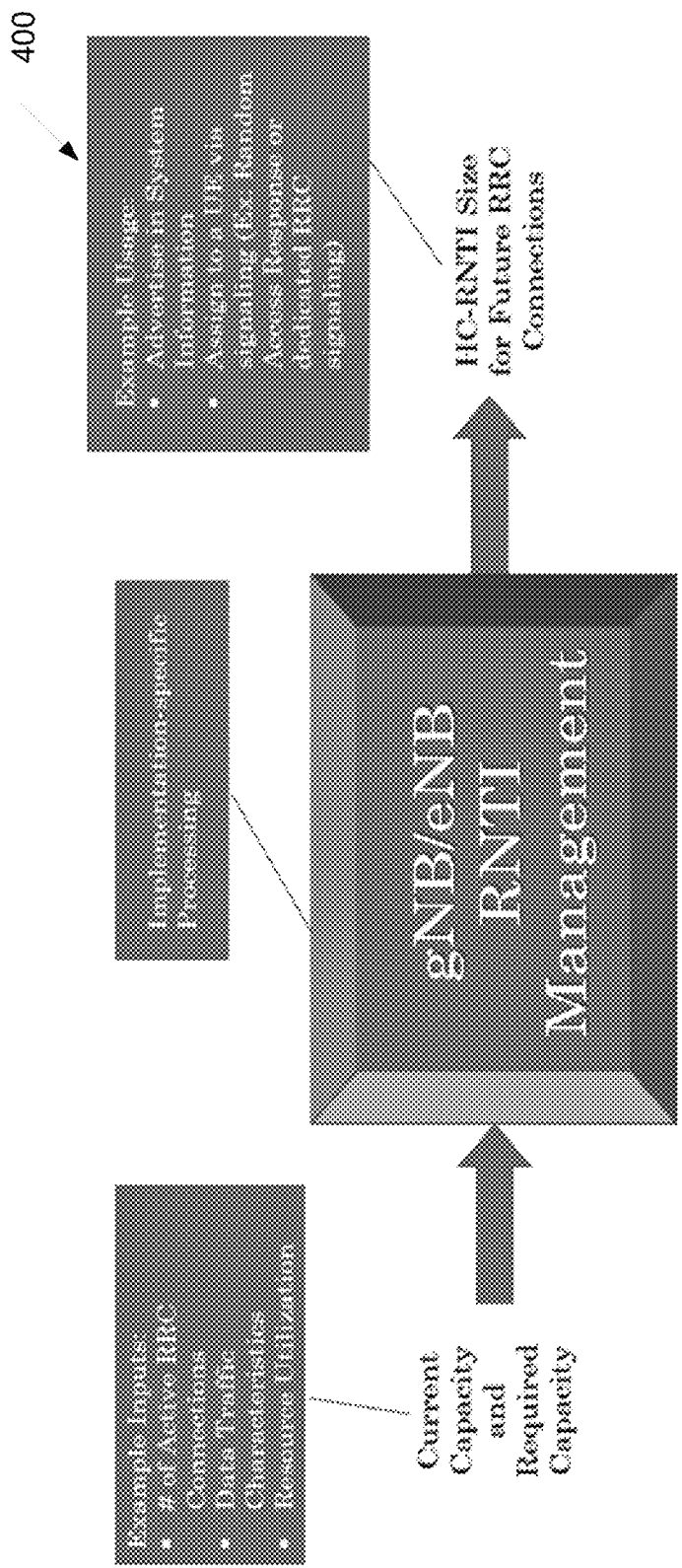
FIG. 4 illustrates an example overall mechanism of defining and using HC-RNTI according to embodiments of the present disclosure.

FIG. 4 illustrates an example overall mechanism 400 of defining and using HC-RNTI according to embodiments of the present disclosure. An embodiment of the overall mechanism 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions.

Figure 5:
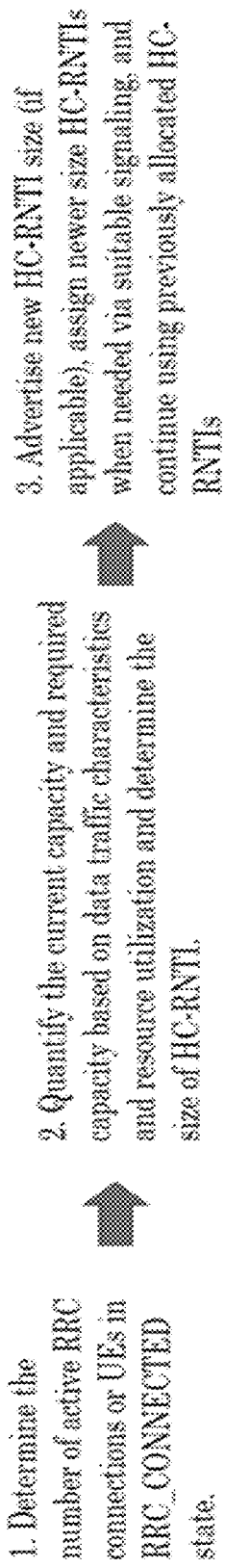
FIG. 5 illustrates an example overall steps of defining and using HC-RNTI according to embodiments of the present disclosure.

FIG. 5 illustrates an example overall steps 500 of defining and using HC-RNTI according to embodiments of the present disclosure. An embodiment of the overall steps 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions.

Figure 6:
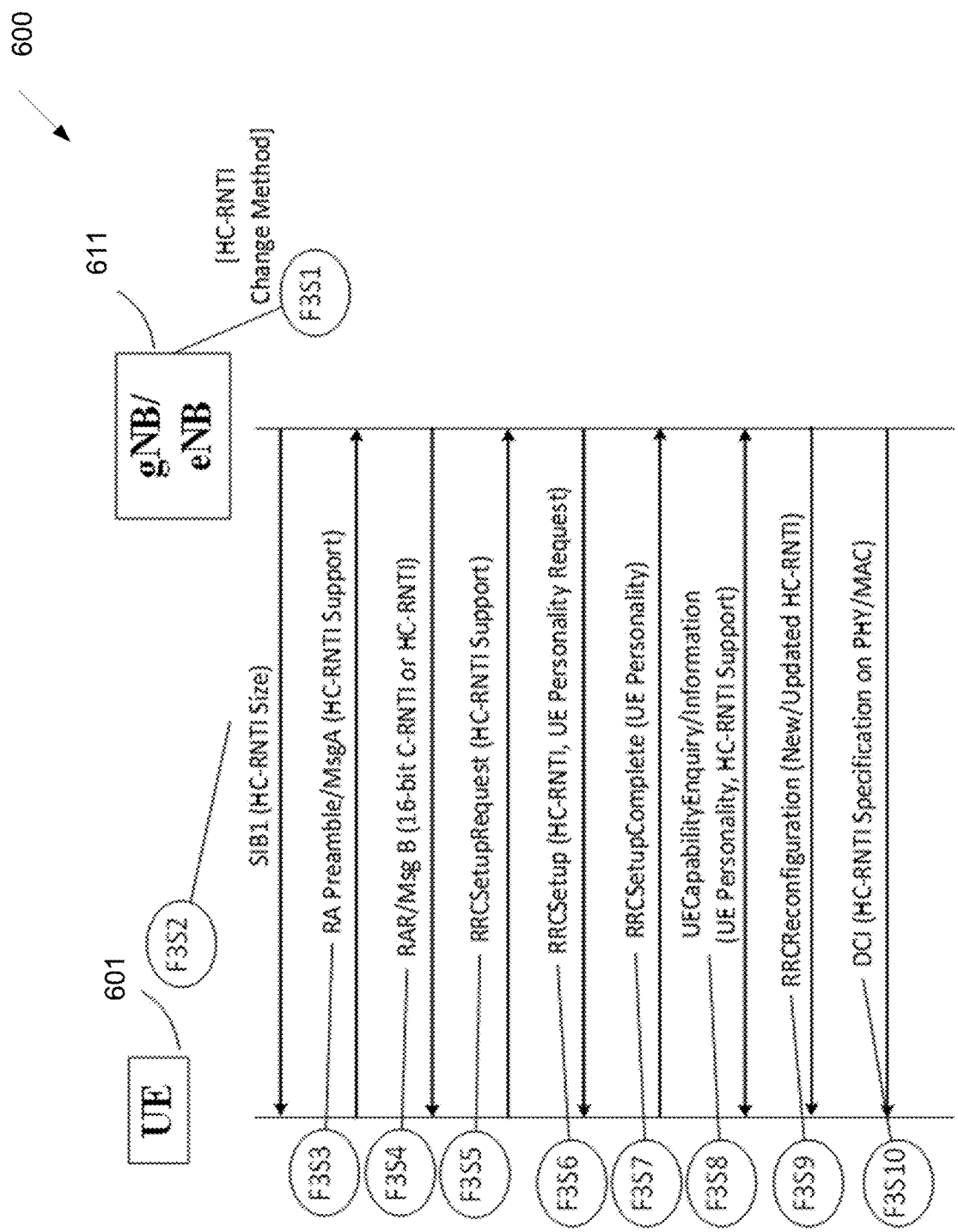
FIG. 6 illustrates a signaling flow for UE-radio network interactions according to embodiments of the present disclosure.

FIG. 6 illustrates a signaling flow for UE-radio network interactions 600 according to embodiments of the present disclosure. An embodiment of the signaling flow for UE-radio network interactions 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

As illustrated in FIG. 6, an overall procedure of UE-radio network interactions that can be influenced by one or more embodiments of the disclosure is illustrated. Note that the support of the larger size RNTI may be mandatory for the UE or may be based on the UE's capabilities.

As illustrated in FIG. 6, in step F3S1, the gNB/eNB makes a decision on how the gNB/eNB wants to support the larger-size (i.e., more than the traditional 16 bits) RNTI such as the HC-RNTI.

In one embodiment, in step F3S1, the network dynamically determines the size of the HC-RNTI (e.g., using the example inputs mentioned as illustrated in FIG. 5) and such HC-RNTI size can increase or decrease based on the factors such as expected RNTI capacity requirements in the near-term future. The difference in lengths between two successive HC-RNTIs may be 1 bit or more (e.g., 4 bits or 8 bits). For example, the HC-RNTI size may be 17, 18, 19, and so on with the resolution of 1 bit or 20, 24, and so on with the resolution of 4 bits.

In another embodiment, the network chooses one size of the HC-RNTI for a given cell from the set of configured or supported values for a long term (e.g., few weeks, few months, or even permanently). For example, the set of supported RNTI sizes greater than 16 may be {20, 24}, and the network may choose the value of 20 when the network decides to allocate a non-16 bit RNTI to a UE.

Note that the traditional 16-bit RNTI can still be useful in maintaining backward compatibility and in supporting certain information such as system information blocks (SIBs).

The scope of the HC-RNTI size is also determined by the gNB/eNB in step F3S1. For example, the gNB/eNB may decide to use the same HC-RNTI size (e.g., 20 bits) for all the UEs in the cell in one approach. In another approach, one HC-RNTI size (e.g., 20 bits) may be used for one UE, and, another HC-RNTI size (e.g., 24 bits) may be used for another UE.

The network's support for HC-RNTI and/or size of RNTI can be conveyed to UEs in different ways.

In one example, in step F3S2, the network can indicate the network's support for HC-RNTI as part of system information such as in SIB1 (e.g., "HC-RNTI supported" or "HC-RNTI not supported"). In another example, a specific value of the HC-RNTI size (e.g., 20 or 24) can be explicitly specified as part of suitable system information such as system information block 1 or SIB1. In yet another example, one or more bits in SIB1 may indicate the size of the HC-RNTI. For example, when two different HC-RNTI sizes are supported, the bit value "0" (or "1") may imply the typical size of 16 bits, while the bit value "1" (or "0") may imply the larger size of 24 bits.

Similarly, if there are four different options available for the HC-RNTI size, two bits would suffice (e.g., "00" for 16 bits, "01" for 20 bits, and so on or via another similar pattern). In another example, some bit values may be reserved for future use. In another example, the number of HC-RNTI size greater than 16 is implied (e.g., 24 bits) when "NTN Type" conveying the indication of a Non Terrestrial Network cell is broadcast; otherwise, the default size of 16 bits is assumed by the UE.

In an example embodiment, the device may convey the device's capability to use HC-RNTI to the radio network during the random access procedure (e.g., by using a preamble from a certain preamble set or by using a transformed preamble) in step F3S3. If the network has indicated the support for the HC-RNTI in step F3S2, the UE can decide to convey such HC-RNTI capability. The gNB/eNB can allocate an HC-RNTI to the UE using any of the example approaches specified in the subsequent steps described next.

In response to the random access (RA) preamble, the gNB/eNB sends the random access response (RAR) to the UE in step F3S4. If the gNB/eNB is aware of the UE's support of HC-RNTI and decides to allocate an HC-RNTI to the UE, the gNB/eNB may assign an HC-RNTI using an enhanced RAR in an embodiment of the disclosure, where the traditional RAR (which contains the traditional 16-bit RNTI called temporary C-RNTI) is extended to support the larger size RNTI. The gNB/eNB may assign the traditional 16-bit C-RNTI in the RAR and assign the larger HC-RNTI later as specified below.

Toward the end of the random access procedure, the UE sends an RRCSetupRequest message to the gNB/eNB in step F3S5. The UE may indicate the UE's support for the HC-RNTI in this message, especially when the UE has not done so while sending the RA preamble in the 4-step random access procedure or Msg A in the 2-step random access procedure.

The gNB/eNB, in step F3S6, may assign an HC-RNTI to the UE using an enhanced RRCSetup message in an embodiment of the disclosure. The gNB/eNB may optionally request the UE to provide the UE's "personality attributes." In an example embodiment, the UE's "personality attributes" include one or more of the following: expected data traffic characteristics (e.g., periodic downlink and/or uplink data transmissions every X time units and amounts of traffic), expected delay requirements for a typical use (e.g., wait time in the buffer and end-to-end delay), power saving profiles, and expected mobility characteristics (e.g., fixed, semi-fixed, low-speed, and high-speed). When the network is aware of such UE personality attributes, the network can configure the UE accordingly for optimal performance.

In one example, if the UE supports HC-RNTI and the UE's personality attributes are compatible with the HC-RNTI, the network may allocate the HC-RNTI to the user and may decide to use longer DRX cycles. Furthermore, in another approach, the gNB/eNB could choose a core network element (e.g., AMF or the MME) that is optimized for certain UE personality attributes (e.g., smartphones vs. delay-tolerant IoT devices/Apps). The UE personality attributes may be conveyed by the core network by the gNB/eNB via an N2/S1AP message or by the UE via a NAS signaling message (e.g., registration/attach request).

The UE, in step F3S7, sends an RRCSetupComplete message. In one embodiment, the UE includes the UE's personality attributes.

In step F3S8, the gNB/eNB sends the UECapabilityEnquiry message and the UE responds with the UECapabilityInformation message. In one embodiment, the UE includes the UE's personality attributes (if not conveyed to the network so far) and the support for HC-RNTI (if not conveyed to the network so far).

In step F3S9, the gNB/eNB sends the RRCReconfiguration/RRCConnectionReconfiguration message to the UE. In one embodiment, the gNB/eNB assigns zero or more types of RNTIs in the larger HC-RNTI format. For example, UE identities other than C-RNTI can be enhanced to a flexible-size HC-RNTI (dynamic or a selected size in a cell per configuration). For example, for configured scheduling, a configured scheduling-RNTI (CS-RNTI) can be enhanced to the HC-RNTI format instead of the traditional 16-bit RNTI format.

In yet another embodiment, the structures of other RNTIs are also transformed to the HC-RNTI. Examples of these RNTIs include transmit power control-sounding reference symbol-RNTI (tpc-SRS-RNTI) (to convey uplink transmit power control commands for the sounding reference signal), tpc-PUCCH-RNTI (to convey uplink transmit power control commands for the physical uplink control channel), tpc-PUSCH-RNTI (to convey uplink transmit power control commands for the physical uplink shared channel), and sp-csi-RNTI (for semi-persistent channel state information reporting on the PUSCH), mcs-C-RNTI (to enable the use of lower spectral efficiency modulation and coding scheme combination), cancellation indication-RNTI (CI-RNTI) (for cancellation indication), interruption-RNTI (INT-RNTI) (for interruption), power saving-RNTI (PS-RNTI) (for power saving), slot format indicator-RNTI (SFI-RNTI) (slot format indicator), sidelink-RNTI (SL-RNTI), and sidelink configured scheduling (SLCS-RNTI).

In step F3S10, the gNB makes use of the assigned HC-RNTI in conjunction with a DCI (downlink control information). In one embodiment, for the HC-RNTI usage with the DCI, the 16-bit cyclic redundancy check (CRC) in a DCI can continue to be scrambled using 16 least significant bits of HC-RNTI when a 16-bit CRC is used. The remaining bits of HC-RNTI can be conveyed in an enhanced DCI message. For example, one or more bits in the enhanced DCI can indicate how many HC-RNTI bits (either the HC-RNTI size or the incremental number of HC-RNTI bits beyond the typical size of 16 bits) are present in the DCI message as shown by the example in FIG. 7.

Figure 7:
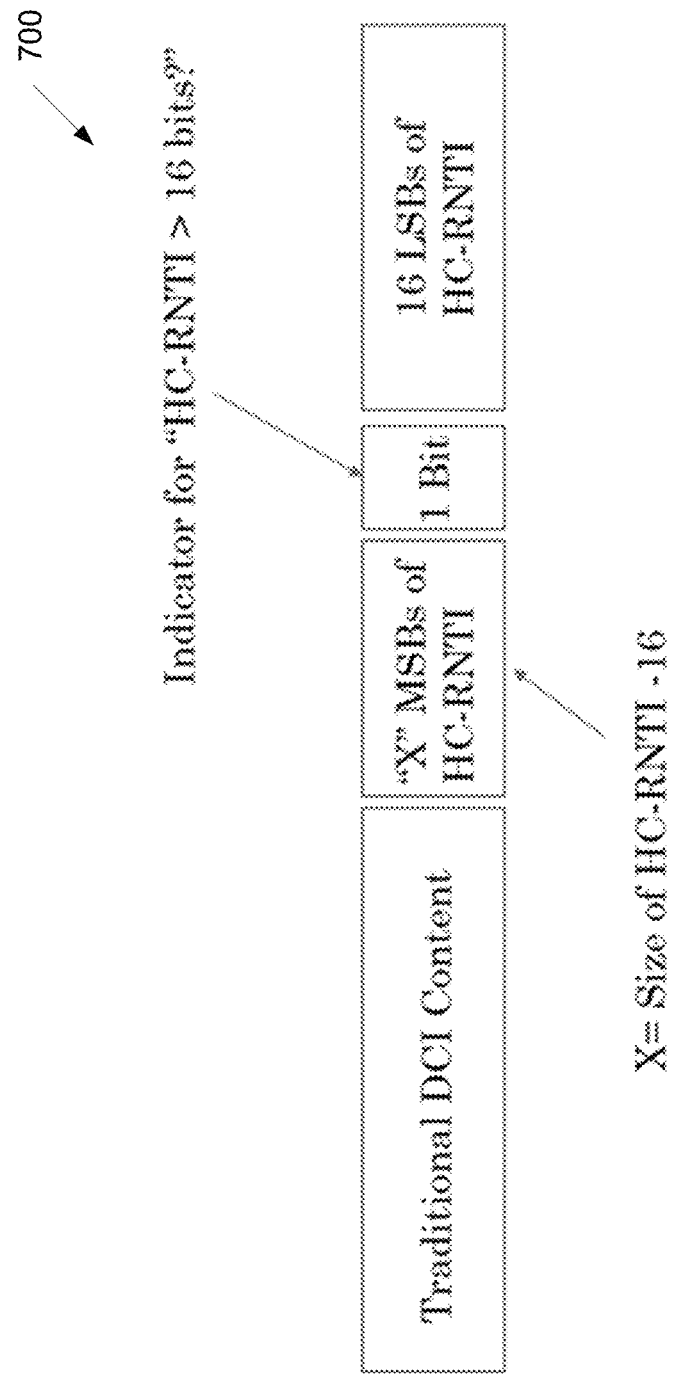
FIG. 7 illustrates an example HC-RNTI in a DCI message according to embodiments of the present disclosure.

FIG. 7 illustrates an example HC-RNTI in a DCI message 700 according to embodiments of the present disclosure. An embodiment of the HC-RNTI in a DCI message 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

In another embodiment, for the HC-RNTI usage with the DCI, a suitable number of the 24-bit CRC is scrambled by the full HC-RNTI if the HC-RNTI size is less than or equal to 24 bits. All the bits of the CRC are scrambled by the partial HC-RNTI if the HC-RNTI size is more than 24 bits. If the CRC size is greater than 24 bits, the same concept can be extended.

Similarly, when a larger-size CRC is used, more bits of HC-RNTI or an equivalent C-RNTI can be represented by the masking the CRC, and fewer remaining bits would need to be separately conveyed to the UE.

Since each UE knows the length of HC-RNTI assigned to it, each UE can correctly retrieve the information of the messages (e.g., DCIs) intended for the UE by the eNB/gNB.

Different message structures (e.g., physical (PHY), medium access control (MAC), or RRC signaling) could be designed to convey HC-RNTI to a given UE. In one embodiment, a part of HC-RNTI may be specified at the PHY layer and part of the HC-RNTI may be specified at the MAC layer.

Furthermore, HC-RNTI may be specified in a manner that ensures reliable detection of the DCI for a given modulation and coding scheme (MCS) combination.

While FIG. 6 illustrates the indication of the HC-RNTI support or the HC-RNTI size by the network via SIB1, another SIB may be used in another embodiment of the disclosure. Furthermore, the network may assign the HC-RNTI to the UE without indicating the HC-RNTI support or the HC-RNTI size in any system information messages in another embodiment of the disclosure.

While FIG. 6 illustrates the indication of the HC-RNTI support by the UE via an RA preamble, RRCSetupRequest, and UECapabiltyInformation, the RRC message called UEAssistanceInformation can also be used for such indication in an embodiment of the disclosure.

While FIG. 6 illustrates the specification of the UE personality attributes via RRCSetupRequest and UECapabiltyInformation, the RRC message called UEAssistanceInformation can also be used for such purpose in an embodiment of the disclosure.

While FIG. 6 illustrates the HC-RNTI assignment via the enhanced RAR or suitable RRC signaling messages, an enhanced MAC header/sub-header or an enhanced MAC control element (CE) can also be used for the HC-RNTI assignment in an embodiment of the disclosure.

In one embodiment, a regular device (e.g., a smartphone) may switch to delay-tolerant Apps/services mode and provide such indication with or without additional attributes to the radio and core networks via suitable radio capability update signaling (e.g., by originating a UE capability information message or UEAssistanceInformation message) for the radio network and registration update signaling for the core network.

An IoT connectivity in a rural environment is still a challenge even in developed countries. A GEO satellite based NTN can be an economical and efficient solution to simultaneously support a massive number of radio connections in rural environments when delay requirements are relaxed. Deploying a terrestrial network to serve massive number of IoT devices in rural environments is technically feasible but may not be economically viable due to low average revenue per user (ARPU) and the amount of geographic area to be covered.

In contrast, an NTN with a large fixed-earth beam can serve numerous delay-tolerant IoT devices such as a variety of sensors and actuators scattered over a large area for smart agriculture (e.g., smart farming sensors for weather conditions, soil quality, and crop health), livestock or cattle management (e.g., animal health, reproductive cycles, and grazing patterns), transport (e.g., asset tracking), and oil and gas infrastructure (e.g., pipelines) management. The diameter of an NTN cell covered by a GEO satellite ranges from 200 km to 1000 km, corresponding to the beam footprint area ranging from about 0.03 million square km to about 0.78 million square km. To cover the entire United States (with the land area of about 9.8 million square km), the number of NTN cells that would suffice is 376, 94, and 16 for the cell diameter of 200 km, 400 km, and 1000 km, respectively when 20% overprovisioning of NTN cells is used for cell overlap. Due to a large coverage area of an NTN cell, it is feasible for the cell to support a massive number of IoT devices scattered over a large area.

In one example, natural disasters such as floods or earthquakes often make the terrestrial wireline or wireless network unavailable. In such cases, NTN-based low-rate communications such as bi-directional SMSs would be extremely useful to the people affected.

In one example, NTNs that can help with emergency communications include GEO satellite based NTNs and HAPS-based NTNs. Due to capacity constraints, even if video calls and voice calls are not allowed for regular consumers (such calls could be supported for public safety personnel, for example) the ability to exchange delay-tolerant SMSs would be highly useful and often critical to save lives and help the people affected by the disaster. An NTN cell with the diameter of 200 km can cover about 31,000 square km or 12,000 square miles. A flexible HC-RNTI would be very attractive in such case, because a large number of users can make use of SMS for emergency communications.

In one example, an NTN can track the containers on ships by supporting delay-tolerant IoT devices. The analysis carried out for scenario of the aforementioned example may also be applicable to maritime communications, where HC-RNTI is shown to significantly increase the capacity of an NTN system for delay-tolerant IoT devices.

As added benefit, people on cruises may also be able to utilize delay-tolerant SMSs. A large cruise ship has few thousand passengers and multiple cruise ships may be in the beam footprint of a large NTN cell. About 30 million cruise passengers are expected in 2019 and the cruise industry boom is expected to continue. An NTN can offer low-cost SMS service so that cruise passengers can stay in touch with their families and friends.

This disclosure provides advanced resource allocation to ensure good performance and user experience during handover even when an NTN has long propagation delays. In a typical LTE and 5G handover, the new cell allocates radio resources for data transfer to the UE at the end of a comprehensive signaling exchange.

In contrast, this feature allocates DL and/or UL radio resources to the UE in the new cell so that the UE can start making use of the resources for user traffic transfer immediately upon receiving a handover command from the source cell instead of waiting for all the extensive signaling to be over.

Depending on the QoS flows and the NTN type, applications that are relatively delay-sensitive can now be supported. For example, LEO-based NTN could benefit tremendously and could potentially support low-delay applications such as interactive gaming. Reduced user traffic interruption enables GEO-based NTN to support best-effort delay-tolerant services with much higher throughput (e.g., email and web browsing) and reduces the probability of upper layer (e.g., transmit control protocol (TCP)) retransmissions. This feature provides flexibility to the gNB/eNB to make the best use of available radio resources by facilitating a suitable tradeoff between the average spectral efficiency in the cell and handover performance. The present disclosure can also be applied to a TN when handover delay needs to be minimized (e.g., for ultra-reliable low latency communications (URLLC) applications) by trading off average spectral efficiency of a cell.

In an NTN, due to long propagation delays, an RRC signaling is much slower compared to a terrestrial network. Furthermore, multiple rounds of signaling exchanges occur between the UE and the radio network as part of random access procedure and RRC reconfiguration in the new cell. As a result, significant interruption in user traffic transfer can occur ranging from tens of milliseconds to hundreds of milliseconds depending upon the NTN type. Advanced resource assignment for the UE in the new cell enables the UE to reduce user traffic interruption significantly.

In an NTN, due to long propagation delays, an RRC signaling is much slower compared to a terrestrial network. Furthermore, multiple rounds of signaling exchanges occur between the UE and the radio network as part of random access procedure and RRC reconfiguration in the new cell. As a result, significant interruption in user traffic transfer can occur ranging from tens of milliseconds to hundreds of milliseconds depending upon the NTN type. Advanced resource assignment for the UE in the new cell enables the UE to reduce user traffic interruption significantly.

In an NTN, propagation delays could be few milliseconds for LEOs or hundreds of milliseconds for GEOs. Because of long propagation delays in an NTN, it takes a long time for the UE's messages to reach the source base station or the target base station. Furthermore, it takes time for the signaling messages from the source BS or the target BS to arrive at the UE. Hence, exchange of RRC signaling is much slower compared to a terrestrial network. Additionally, multiple rounds of signaling exchanges occur between the UE and the radio network as part of random access procedure and RRC reconfiguration in the new cell. Due to long propagation and signaling exchange delays, the user traffic is interrupted for tens of milliseconds for LEO-based NTNs and hundreds of milliseconds for GEO-based NTNs. The service experience for users is degraded for such prolonged handover duration.

In a typical LTE and 5G handover, the new cell allocates radio resources for data transfer to the UE at the end of a comprehensive signaling exchange. This feature allocates DL and/or UL radio resources to the UE in the new cell so that the UE can start making use of the resources for user traffic transfer immediately upon receiving a handover command from the source cell instead of waiting for all the extensive signaling to be over.

Figure 8:
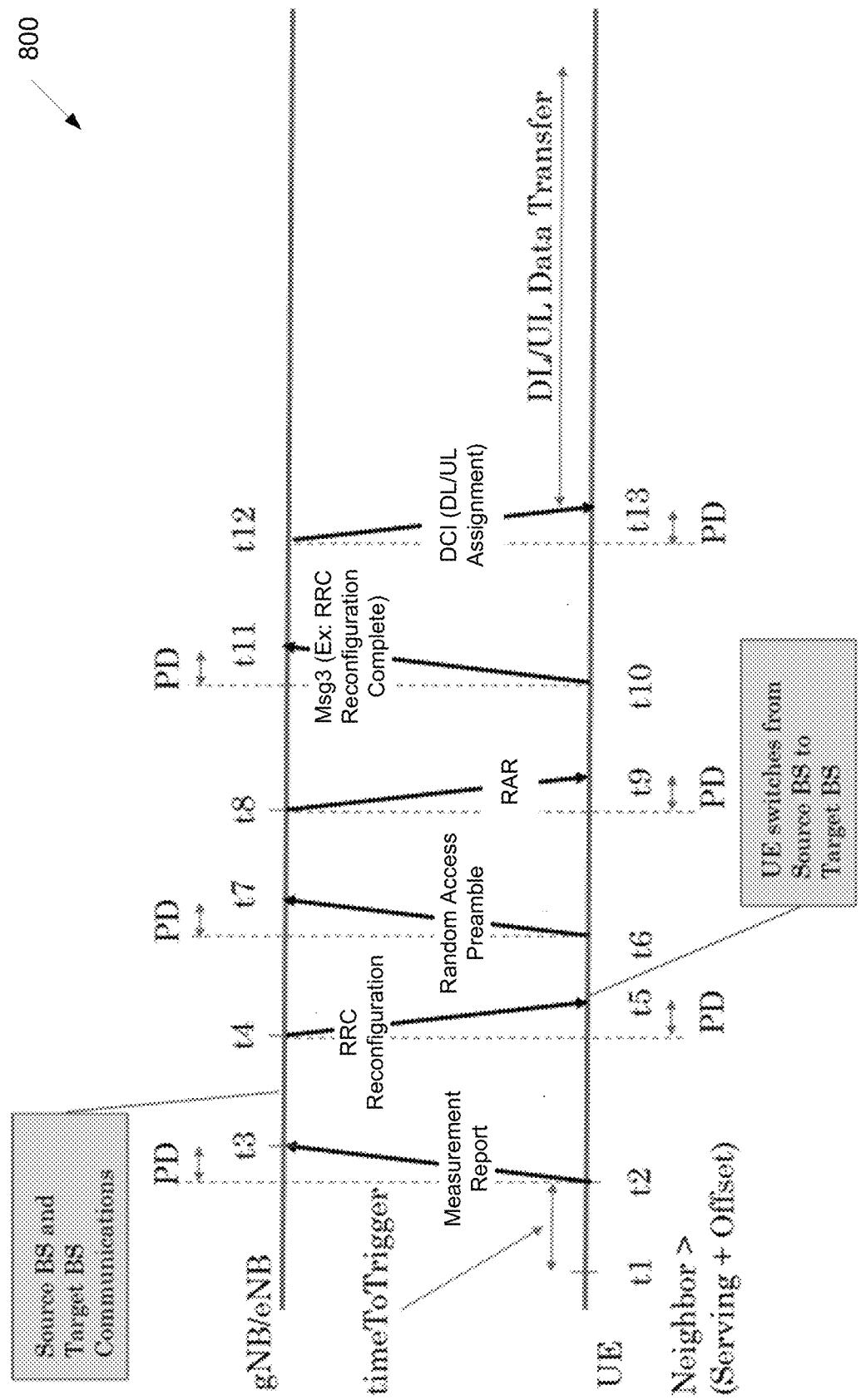
FIG. 8 illustrates ab example handover timeline according to embodiments of the present disclosure.

FIG. 8 illustrates ab example handover timeline 800 according to embodiments of the present disclosure. An embodiment of the handover timeline 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

Consider typical handover in a terrestrial network. FIG. 8 illustrates a typical timeline for handover in LTE and 5G. According to the event A3, the UE sends a measurement report when the neighboring cell becomes an offset better than the serving cell and stays better than the serving cell for the duration of timeToTrigger.

AS illustrated in FIG. 8, at time t2, event A3 occurs, and the UE sends a measurement report containing the measurements of the serving cell and the candidate cell. The gNB/eNB makes a handover decision, gets the approval of the target gNB/eNB and sends a handover command to the UE at time t4 in the form of an RRC message such as RRC reconfiguration. The UE stops communicating with the source cell/base station and initiates the random access procedure toward the target cell/BS by sending an RA preamble at t6.

The target BS replies with a random access response and includes a timing adjustment to facilitate UL synchronization and UL resource allocation in the form of a grant. The UE sends an RRC reconfiguration complete message (so-called Msg3 or Message 3) at time t10 using the allocated UL grant to complete the handover process.

In on embodiment, a typical gNB/eNB allocates DL/UL resources after receiving Msg3. Since a UE with a single transceiver (TRX) communicates with a single cell on a given carrier frequency, data transfer cannot occur for such UEs between t5 and t13.

This feature enables uplink data transfer immediately after the handover command in the form of RRC reconfiguration is received at the UE at t5. This feature also enables downlink data transfer at the time when RAR is received at the UE at time instant t9. Hence, the uplink data transfer interruption can be reduced by (t13−t5) for the uplink and (t13−t9) for the downlink.

In another embodiment, upon receiving the handover command, the UE can send a physical random access channel (PRACH) preamble and any UL data in the target cell, return to the source cell after sending the PRACH preamble for DL data transfer for the duration of approximately round trip time (RTT), which is twice the one-way propagation delay, and come back and stay in the target cell for receiving RAR and for any future DL and UL data transfer. In such case, the reduction in the DL data transfer interruption (=t13−t6) is almost the same as the reduction in UL data transfer interruption (=t13−t5).

TABLE 1 shows potential reductions in user traffic interruptions for GEO-based NTNs and LEO-based NTNs.

TABLE 1

| | Potential reduction | |
|---|---|---|
| NTN type | Reduction in uplink user traffic interruption (=4*PD) (ms) | Reduction in downlink user traffic interruption (=2*PD) (me) |
| GEO (transparent payload) | 960 ms to 1120 ms | 480 ms to 560 ms |
| LEO (regenerative payload, gNB on the satellite) | 10.8 ms to 60 ms | 5.4 ms to 30 ms |

The PUSCH structure that is compatible with PRACH may be selected for uplink data transfer during handover. For example, PUSCH may have subcarrier spacing and time structures that are compatible with PRACH so that implementation complexity is reduced.

PUSCH may be transmitted along with PRACH preamble based on UE and eNB/gNB capabilities. In another example, a PRACH preamble is followed in time by a compatible PUSCH.

Depending upon the link budget for the PRACH preamble and PUSCH transmission configuration during handover, blind PUSCH repetitions or blind PUSCH retransmissions may be carried out per eNB/gNB-specified configuration.

A suitable power offset between PRACH and PUSCH may be specified for use during handover.

After RAR is received, PUSCH transmission can reflect any timing adjustment and can continue using advanced resource allocation based on radio configuration.

After RAR-based timing adjustment is done, PUSCH transmissions would be well-aligned with the target UL timing at the cell.

Figure 9:
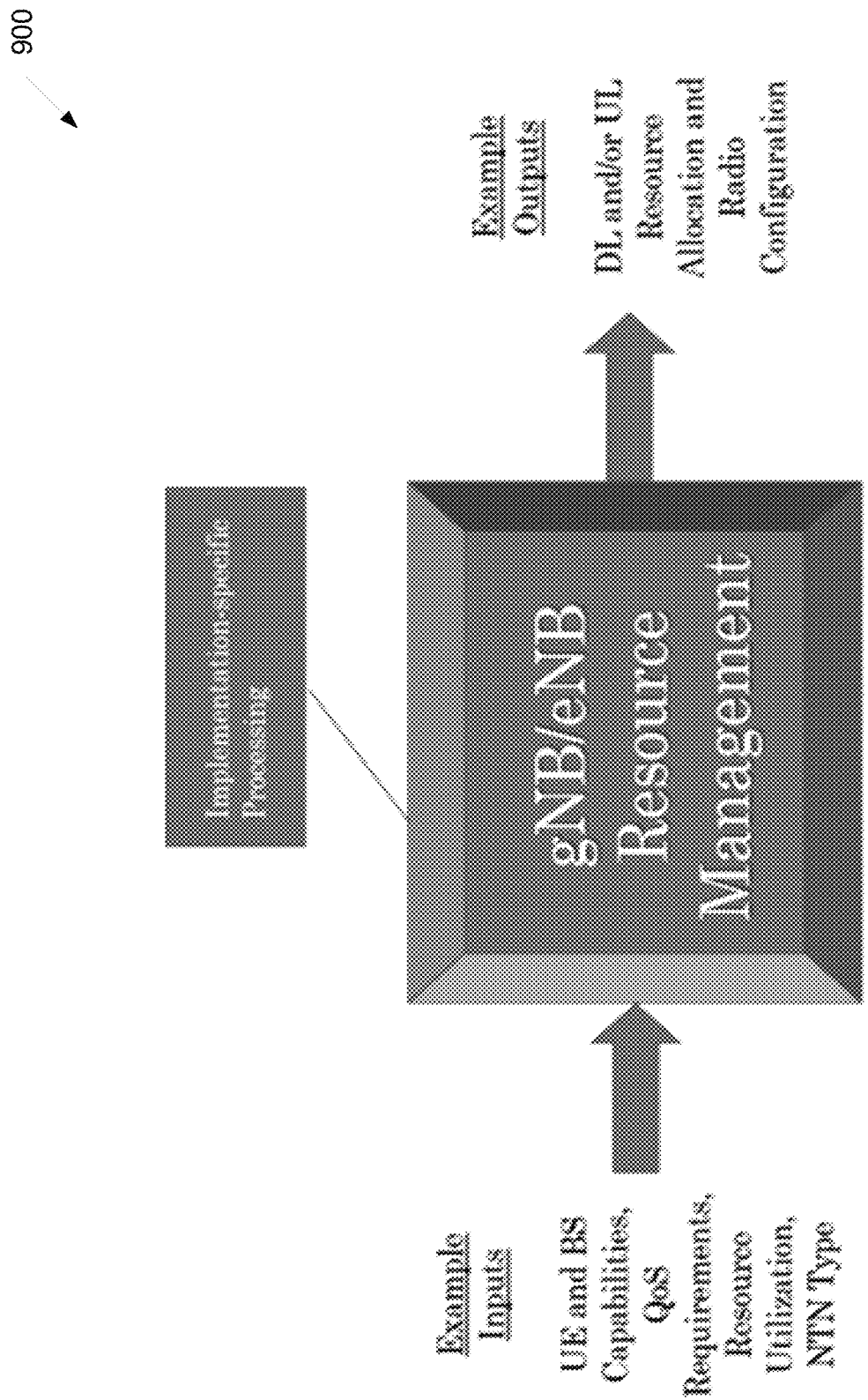
FIG. 9 illustrates an example resource management for reduction in user traffic interruption according to embodiments of the present disclosure.

FIG. 9 illustrates an example resource management 900 for reduction in user traffic interruption according to embodiments of the present disclosure. An embodiment of the resource management 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

FIG. 9 illustrates example inputs and outputs of an implementation-specific resource management algorithm at an eNB/gNB that reduces the user traffic interruptions for an example embodiment of the disclosure.

In one implementation-specific manner, the eNB/gNB uses inputs such as UE capabilities and BS capabilities, QoS requirements, resource utilization, and type of NTN to allocate radio resources and carry out suitable radio configuration so that user traffic experiences a short interruption during handover in spite of long propagation and signaling delays.

The UE and the BS capabilities related to simultaneous transmission/reception of uplink channels such as PRACH and PUSCH, in-sequence transmission/reception of uplink channels PRACH and PUSCH (e.g., PRACH preamble transmission immediately followed by transmission of a compatible PUSCH), simultaneous transmission/reception of RAR and DL user traffic, and simultaneous transmission/reception of Message 3 (e.g., RRC reconfiguration complete) and UL user traffic.

The eNB/gNB may consider QoS requirements of LTE EPS bearers and 5G QoS flows to identify the bearers/flows that can benefit from advanced resource allocation. Traditional layer 2 (e.g., at radio link control (RLC)) prioritization methods can also be used to distribute UL resources among active bearers/flows.

The eNB/gNB may consider the availability of radio resources to determine if advanced resource allocation should be carried out or not.

The eNB/gNB may use the type of NTN to determine when and for how long, and how frequently the radio resources are available to the UE.

The target eNB/gNB can choose to perform advanced radio resource allocation to minimize the user traffic interruption, especially when it has relatively more radio resources available. For example, the target eNB/gNB determines time and frequency resources of radio resources ("handoverSchedulingResources") for the downlink only, the uplink only, and both the downlink and the uplink.

The resources may be made available for a certain time period and/or until resource allocation is carried out using traditional scheduling methods (e.g., traditional dynamic scheduling via PDCCHs, semi-persistent scheduling, or traditional configured scheduling) in one or both directions (i.e., uplink and downlink).

The time-frequency resources such as physical resource blocks (PRBs) or subcarriers in the frequency domain and OFDM symbols/slots/subframes in the time domain for a suitable carrier frequency or a carrier bandwidth part may be specified with a certain periodicity (e.g., every X ms).

The eNB/gNB may specify a special radio configuration for use during handover, which could be valid until a suitable timer expires or an event such as traditional scheduling occurs. For simplicity and/or robustness, a radio configuration may use PDSCH/PUSCH aggregation, may enable or disable HARQ, may specify the configuration for blind HARQ retransmissions, and may specify a suitable channel quality indicator (CQI) table. A radio configuration suitable for use after the handover is completed may be specified just like the traditional approach.

The PUSCH structure that is compatible with PRACH may be selected for uplink data transfer during handover. For example, PUSCH may have subcarrier spacing and time structures that are compatible with PRACH so that implementation complexity is reduced.

To reduce interference, certain time-frequency resources surrounding the user traffic transmissions in PUSCH may not have actual transmissions (e.g., null subcarriers like the ones for PRACH). These resources may be inside the allocated PUSCH resources or outside the allocated PUSCH resources.

A PUSCH may be transmitted along with PRACH preamble based on UE and eNB/gNB capabilities. In another alternative, a PRACH preamble is followed in time by a compatible PUSCH.

Depending upon the link budget for the PRACH preamble and PUSCH transmission configuration during handover, blind PUSCH repetitions or blind PUSCH retransmissions may be carried out per eNB/gNB-specified configuration.

A suitable power offset between PRACH and PUSCH may be specified for use during handover.

After RAR is received, PUSCH transmission can reflect any timing adjustment and can continue using advanced resource allocation based on radio configuration.

After RAR-based timing adjustment is done, PUSCH transmissions would be well-aligned with the target UL timing at the cell.

Figure 10:
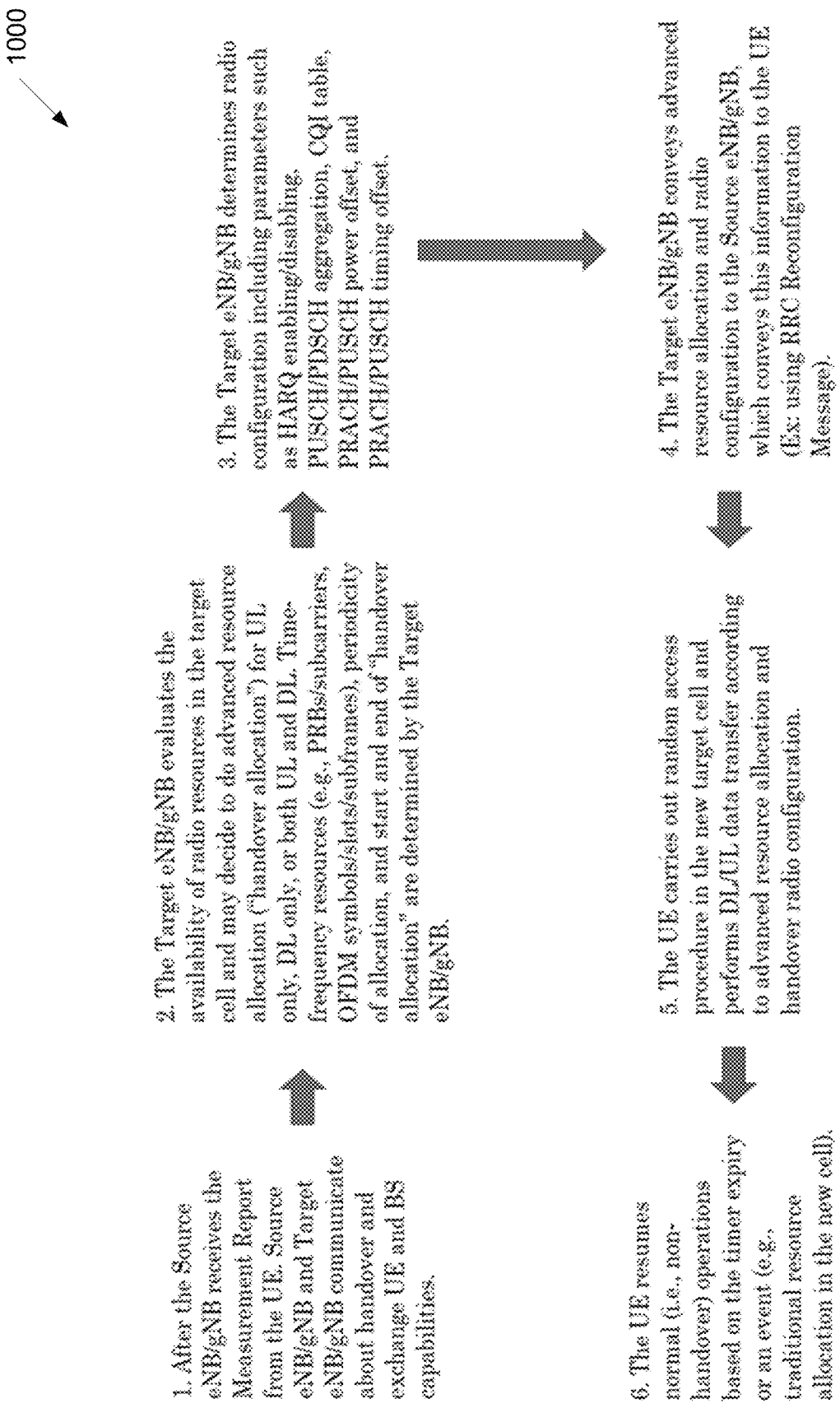
FIG. 10 illustrates an example steps of resource management for reduction in user traffic interruption according to embodiments of the present disclosure.

FIG. 10 illustrates an example steps of resource management 1000 for reduction in user traffic interruption according to embodiments of the present disclosure. An embodiment of the steps of resource management 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, to minimize the user traffic interruption, the target eNB/gNB reserves suitable DL and/or UL resources for the UE and the UE learns about the allocated resources via RRC signaling from the source eNB in step 4. Thereafter, the UE uses allocated resources to exchange DL and/or UL user traffic using PUSCH and PDSCH in the new cell and using the radio configuration specific to handover duration.

In one implementation, the PRACH preamble and PUSCH containing user traffic can be transmitted simultaneously or PUSCH can follow the PRACH preamble transmission.

Along with RAR, the UE can receive PDSCH using previously allocated radio resources. RAR, along with DL user traffic, may also use the radio resources allocated in advance.

Similarly, the UE can continue sending UL user traffic before and along with Message 3 (e.g., RRC reconfiguration complete).

The "handover duration" gets over when a configured timer expires or traditional resource allocation occurs (e.g., PDCCH-based dynamic scheduling).

Figure 11:
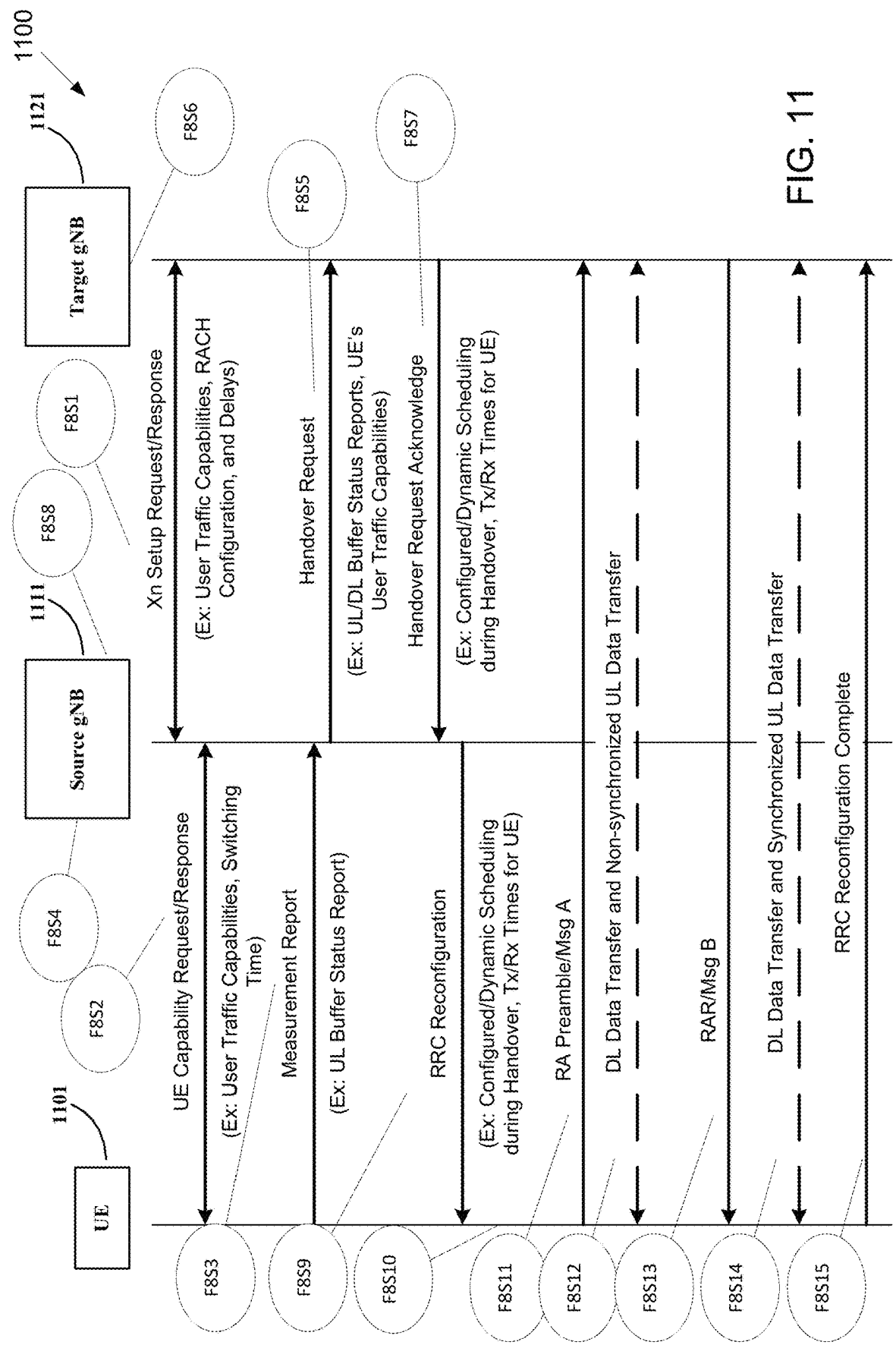
FIG. 11 illustrates a signaling flow for UE and network interaction according to embodiments of the present disclosure.

FIG. 11 illustrates a signaling flow for UE and network interaction 1100 according to embodiments of the present disclosure. An embodiment of the signaling flow for UE and network interaction 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

FIG. 11 illustrates the overall process of inter-gNB handover in 5G and summarizes additional examples of the embodiments.

As illustrated in FIG. 11, in step F8S1, the source gNB (S-gNB, 811) and target gNB (T-gNB, 821) exchange XnAP Xn setup request and Xn setup response messages. In one embodiment, the gNBs inform each other about their support for the user traffic interruption during handover through a variety of mechanisms such as various scheduling options including RRC-based scheduling, hybrid RRC and DCI-based scheduling commonly known as semi persistent scheduling, and immediate or delayed dynamic scheduling, and the return of the UE to the source gNB after the UE has sent a random access preamble or Msg A to the T-gNB. The gNBs also exchange relevant common radio configuration to facilitate user traffic transfer such as RACH configuration per serving cell.

To help the gNB (i.e., S-gNB or T-gNB) determine the times when the UE and the gNB would be ready to transmit and receive suitable channels and signals, the S-gNB and the T-gNB can also exchange specifics about transport and processing delays including but not limited to onegNBTo-AnothergNBXnTransferDelay (i.e., from source gNB1 to target gNB2 and from target gNB2 to source gNB1), XnAPmsgProcessingTimeAtSourcegNB (i.e., the time required by the S-gNB to process an XnAP message received from T-gNB such as handover request acknowledge message, and sourcegNBToUERxTimeForRRCReconfig (i.e., the estimated time from the instant the S-gNB has sent an RRC message such as RRC reconfiguration message to the instant the UE is ready to receive information from the T-gNB and transmit information to the T-gNB (which includes the propagation delay and the time needed by the UE to switch from S-gNB to T-gNB).

As illustrated in FIG. 11, in Step F8S1, in case the gNB is disaggregated, the gNB-CU and the gNB-DU exchange information about the support for the reduction in the user traffic interruption feature through F1 SETUP REQUEST and F1 SETUP RESPONSE.

In step F8S2, the UE and the S-gNB exchange capabilities related to the user traffic prior to handover (e.g., after RRC connection setup). For example, in an embodiment of the disclosure, the UE conveys the UE's support for mechanisms including return to the source cell to resume user traffic data transfer and the time required to switch from the S-gNB to the T-gNB, ST. If the UE has received the RRC reconfiguration message successfully at time t, it is ready to transmit to the T-gNB and receive from the T-gNB at the time (t+ST). Furthermore, the UE may indicate the UE's support for reception and decoding of all DCI formats prior to the reception of random access response (and prior to transmission of RRC reconfiguration complete) in a 4-step random access procedure (both contention-free random access (CFRA) and contention-based random access (CBRA), although CFRA is preferred during handover). Such indication about DCI formats means that the UE decodes DCI formats associated with C-RNTI (allocated by the T-gNB) and RA-RNTI during the random access procedure associated with handover.

In step F8S2, in an embodiment of the disclosure, the UE and the source gNB/eNB exchange the support for the overall feature of user traffic transfer and (potentially) the type of data transfer in the uplink and/or the downlink (e.g., immediate or delayed dynamic scheduling, immediate or delayed configured scheduling) and related parameters (e.g., userTrafficTransferDuringHandover and returnToSource-CellForDataTransferDuringHandover) via UE capability Enquiry and UE capability information messages. Immediate dynamic scheduling means that the UE can be conveyed a DL or UL resource association via a DCI format at any suitable time after the UE has received the RRC reconfiguration message carrying the handover command.

Delayed dynamic scheduling means that the UE can be conveyed a DL or UL resource association via a DCI format at any suitable time after the UE has received the random access response from the target cell. Immediate configured scheduling means that the UE can transmit user traffic in the uplink and/or receive user traffic in the downlink at any suitable time after the UE has received the RRC reconfiguration message carrying the handover command. Delayed configured scheduling means that the UE can transmit user traffic in the uplink and/or receive user traffic in the downlink at any suitable time after the UE has received the random access response from the target cell.

In step F8S3, in an embodiment of the disclosure, the UE includes a buffer status report ("handoverBSR") along with the measurement report message if configured by the S-gNB in the RRC reconfiguration message received prior to the transmission of the measurement report message. This BSR conveys the status of the uplink buffers at the UE (e.g., amounts and type/priority of available UL traffic). Such report helps the gNBs decide (i) if any user traffic interruption approach is beneficial and (ii) the amount of radio resources that may be required or desirable for the UE.

In step F8S3, in an embodiment of the disclosure, information about the UE's traffic may be provided by the S-gNB to the T-gNB based on the most recent information (e.g., last received BSR with or without the relevant time stamp and enhanced UEAssistanceInformation conveying any traffic pattern).

In step F8S4, the S-gNB makes a handover decision and identifies the T-gNB associated with the target cell for handover.

In step F8S5, the S-gNB sends an XnAP handover request message to the T-gNB. In an embodiment of the disclosure, the S-gNB includes the UL buffer status report received from the UE in this message. Furthermore, the S-gNB constructs a new buffer status report that specifies amounts and type/priority of available DL traffic at the time the Handover request message is sent. Such reports facilitate the decision-making at the T-gNB regarding (i) whether to use the feature of reduction in user traffic interruption during handover, (ii) the type of scheduling to be used during handover (e.g., configured scheduling vs. dynamic scheduling) and (iii) the amount of radio resources to be allocated to the UEs (especially for configured scheduling). The S-gNB may also indicate the UE's capabilities related to the supported methods and associated parameters (e.g., switching time from S-gNB to T-gNB and from T-gNB to S-gNB). The S-gNB may also indicate the S-gNB's preference for the method(s) to reduce the user traffic interruption (e.g., UE stays with the target cell or returns to the source cell after receiving the handover command). The final decision of the specific method or a combination of methods to reduce the user traffic interruption during handover can be made by the S-gNB or the T-gNB.

In step F8S6, the T-gNB determines the radio configuration and the handover traffic mechanism(s) and associated parameters.

In step F8S6, in support of immediate configured scheduling and delayed configured scheduling for the downlink, the T-gNB may determine the following so that a suitable RRC reconfiguration message carrying the radio configuration in the new cell can be constructed.

In one embodiment, the T-gNB may configure PDCCH-less immediate configured scheduling for the DL for the user. In one method of implementation, the scope of "SPS-Config" is extended by adding a parameter PDCCH-less-ActivationEnabled (disabled or enabled). When this parameter is "enabled," a time offset parameter ConfiguredSchedulingStartTimeDL to specify the time when the configured scheduling takes an effect. Such parameter enables the UE and the target gNB to be aware of the earliest/first transmit/receive times of channels and signals such as PDSCH for the UE.

In one example, the target gNB may specify (hyper frame number (HFN), system frame number (SFN), Slot # in a frame) as ConfiguredSchedulingStartTimeDL to identify the first valid slot for the DL scheduling.

In another example, ConfiguredSchedulingStartTimeDL can be determined using an offset relative to a reference SFN such as timeDomainOffset. Furthermore, a suitable PUCCH resource allocation for HARQ feedback (e.g., PUCCH-ResourceId in SPSConfig) is carried out by the T-gNB. The T-gNB also adds PDSCH-to-HARQ_feedback_timing_indicator to specify the HARQ feedback in response to the DL packet received on PDSCH.

In one embodiment, to extend the range of the periodicity of Configured Scheduling/SPS, T-gNB adds a parameter scalingFactorForPeriodicity (Example range: $1/320$, $1/160$, $1/80$, $1/40$, . . . , 1).

The actual periodicity of resource allocation is (scalingFactorForPeriodicity*periodicity). For example, if scalingFactorForPeriodicity is $1/80$ and periodicity is 10 ms, the actual or effective periodicity of the resource allocation is $1/8$ ms, which is the slot length associated with the subcarrier spacing of 120 kHz for PDSCH and PUSCH.

In one embodiment, the T-gNB may allow the DL allocation to be used for new transmission only like R15 (with retransmissions scheduled dynamically) or (as an enhancement) allow the DL allocation to be used for both new transmissions and retransmissions as an enhancement.

In one embodiment, the T-gNB allows deactivation of the DL configured scheduling via a PDCCH or a medium access control element (MAC CE) (e.g., when the DL buffer is empty or hybrid automatic repeat request (HARD) feedback from the UE is not received X times).

In one embodiment, the T-gNB selects delayed configured scheduling for the DL. In this approach, the resource allocations are valid after the UE has received RAR from T-gNB.

In step F8S6, in support of immediate and delayed Configured Scheduling for the UL, the T-gNB determines a timer for the validity of the configured grant during handover and/or an event to specify event-based termination of the configured grant in an embodiment of the present disclosure. Immediate configured scheduling for the UL is valid soon after the reception of the RRC reconfiguration message at the UE, while delayed configured scheduling for the UL is valid after the reception of the RAR at the UE.

In step F8S6, in support of immediate dynamic scheduling during handover, the T-gNB determines the instant at which the UE is required to monitor DL and UL resource allocation DCI Formats (e.g., 0_0, 0_1, 1_0, and 1_1) on a PDCCH with a CRC scrambled by C-RNTI.

In one example, such time could be defined as X ms after the reception of the RRC reconfiguration message at the UE. This Switching Time (ST) of X ms can be a UE capability parameter or part of minimum UE performance requirements. The ST could be UE-specific, common to a set of UEs, or common to all UEs.

In another example, the T-gNB determines ImmediateDynamicSchedulingStartTime as (HFN, SFN, Slot # in a frame) or as an offset to a reference HFN/SFN in the target cell.

In step F8S6, in support of delayed dynamic scheduling during handover, the gNB indicates the UE the use of delayed dynamic scheduling so that the UE monitors DL and UL resource allocation DCI Formats (e.g., 0_0, 0_1, 1_0, and 1_1) on a PDCCH with a CRC scrambled by C-RNTI allocated by the target gNB/eNB (in addition to RA-RNTI) beginning at the time the UE expects to receive the random access response message.

In step F8S6, in support of 2-step contention-free random access, in an embodiment of the disclosure, the T-gNB extends the structure of msgA-PUSCH-Config-r16 PUSCH of msg A such that the UE can use multiple (including all) PUSCH occasions to send user traffic without the accompanying RA preamble. The UE carries out PUSCH transmissions regardless of the state of MsgB reception. The T-gNB may allow repetition of the PUSCH occasions for user traffic transmission. This may enable the gNB to monitor the PUSCH even after successfully receiving the first PUSCH reception (along with the RA preamble).

In step F8S6, in support of configured scheduling, in an embodiment of the disclosure, allocated downlink and/or uplink resources can be implicitly released if the allocated downlink and/or uplink resources are not used for numUnusedOpportinitiesDownlink times in the downlink and/or numUnusedOpportinitiesUplink times in the uplink. The configured resources can also be explicitly released using a PDCCH (or a MAC CE) similar to how semi-persistent resources are released. To reduce the PDCCH monitoring by the UE, the gNB may send a deactivation command during the times configured scheduling resources are used in the downlink.

In step F8S6, in support of the data transfer, in an embodiment of the disclosure, the T-gNB configures the UE with configurable amounts of guard times and/or guard bands for uplink transmissions (e.g., PUSCH and/or PUCCH) until the RAR is received at the UE. These guard times/bands can be used for actual transmissions (e.g., of PUSCH and PUCCH) after the UE has received the RAR. In another example, the gNB may create implicit guard times/bands through scheduling.

As part of step F8S5 and step F8S6, if the gNB is disaggregated, a suitable UE context to enable this feature is created using UE CONTEXT SETUP REQUEST and UE CONTEXT SETUP RESPONSE. Furthermore, when appropriate, UE CONTEXT MODIFICATION REQUEST and UE CONTEXT MODIFICATION RESPONSE are used to modify the UE context to reflect handover.

In step F8S7, the T-gNB replies with handover request acknowledge message and includes the user traffic interruption related parameters determined in Step F8S6 (e.g., radio resource allocation according to the type of scheduling and the time when the UE can transmit to and receive from the T-gNB. The T-gNB may also indicate the T-gNB's preference for the method(s) to reduce the user traffic interruption (e.g., UE stays with the target cell or returns to the source cell after receiving the handover command). The final decision of the specific method or a combination of methods to reduce the user traffic interruption during handover can be made by the S-gNB or the T-gNB.

In step F8S8, the S-gNB processes the handover request acknowledge message and finalizes the method(s) and the associated parameters.

In step F8S9, the S-gNB sends the RRC reconfiguration message to the UE, which includes the radio configurations applicable in the target cell, which are determined by the T-gNB in step F8S6.

In step F8S10, the UE processes the received RRC reconfiguration message to the UE and prepares to implement the method(s) to reduce the traffic interruption using the configurations specified by the S-gNB and the T-gNB.

In step F8S11, the UE sends a RA preamble in case of the 4-step random access procedure or Msg A (i.e., Message A) in case of the 2-step random access procedure, processes the received RRC reconfiguration message to the UE, and prepares to implement the method(s) to reduce the traffic interruption using the configurations specified by the S-gNB and the T-gNB.

In step F8S12, downlink data transfer and non-synchronized uplink data transfer can occur between the UE and the T-gNB if the UE is not asked to return to the source cell to resume user traffic transfer.

In one embodiment, such data transfer is allowed before, after, or when the UE transmits the UE's RA preamble or message A in step F8S11. For example, the T-gNB might have chosen configured scheduling and allocated downlink and/or uplink radio resources for the user traffic. The uplink data transmission from the UE may not result in a synchronized reception at the T-gNB, because the UE has not yet received the random access response containing the UL timing adjustment from the T-gNB. The data transfer may occur using configured scheduling or dynamic scheduling. Furthermore, in case of the 2-Step RA procedure, the UL data transfer may occur using a set of configured PUSCH Occasions.

In step F8S13, the T-gNB sends RAR in case of the 4-step RA procedure and Msg B (i.e., Message B) in case of the 2-step RA procedure.

In step F8S14, downlink data transfer can continue via configured and/or dynamic scheduling. Additionally, the uplink data transfer can now be synchronized because the UE has received the RAR containing the UL timing adjustment.

In step F8S15, the UE sends RRC reconfiguration complete to the T-gNB. When the T-gNB receives this message, it is the formal completion of a successful handover. In an embodiment of the disclosure, the configured scheduling configured for handover can now be terminated based on a timer or an event (e.g., transmission/reception of the RRC reconfiguration complete message or reception of DL/UL dynamic scheduling at the UE after the UE has sent the RRC reconfiguration complete message).

While FIG. 11 illustrates example embodiments for the 4-step RA and the 2-step RA, the concept of user traffic transfer discussed here also applies to RACH-less handover. In RACH-less handover, the traditional Msg 1 and Msg 2 are skipped and the UE starts sending Msg 3 (e.g., RRC reconfiguration complete). In one embodiment, for RACH-less handover, the user traffic transfer can occur before, along with, or after the transmission of Msg 3.

In one embodiment, the network specifies the support for one or more types of RA (i.e., 4-step RA, 2-step RA, and RACH-less) via broadcast signaling, groupcast/multicast signaling or dedicated signaling (e.g., RRC reconfiguration message). For example, in one embodiment, as part of handover command, the target gNB explicitly specifies to the UE which method (i.e., 4-step RA, 2-step RA, and RACH-less) the UE should use to complete the handover process in the target cell. Furthermore, a distinction may also be made by the gNB between CBRA and CFRA although CFRA is typically preferred for handover. In another approach, the target gNB allocates resources and specifies parameters conveying the 4-step RA, 2-step RA, or RACH-less handover configuration to imply the use of a specific method (i.e., 4-step RA, 2-step RA, and RACH-less).

In one example, for low-delay applications, a set of applications that can work with tens of ms of delay are made feasible by this feature. For example, certain gaming applications can be supported using a LEO-based NTN in conjunction with this feature.

In one example, for higher throughput, since the user traffic interruption time is significantly reduced compared to the traditional approach followed for a terrestrial network, high throughput can be expected during handover for all NTN types.

In one example, for reliable data transfer, if the UE stays with the new cell after receiving the handover command from the previously serving cell and does not go back to the previously serving cell, the UE implementation in support of this feature is simplified. In particular, since the UE is connected to a better cell (i.e., the new serving cell), data transfer can be expected to be more reliable when the UE stays in the new cell compared to the case where data transfer occurs in the previously serving cell after a handover command is sent to the UE.

A UE may be asked by the network to operate in a DRX mode to save energy. This feature provides complete absence of downlink reception or partial absence of downlink reception when HARQ stalling has occurred. The feature also provides configurable timer-based resumption of DRX when appropriate. These actions of the feature avoid unnecessary monitoring of PDCCHs, leading to power savings for the NTN UEs operating in the DRX mode. Furthermore, the feature minimizes the packet delay by exploiting the knowledge of minimum round trip time (MRTT).

When a UE is operating with DRX, the UE monitors PDCCHs for the duration of drx-InactivityTimer after the last DL/UL assignment is received on a PDCCH. Since no assignment can occur when HARQ is stalled, the UE is unnecessarily monitoring PDCCHs continuously during drx-InactivityTimer, leading to waste of the UE's battery power.

Upon expiration of drx-InactivityTimer, the UE enters DRX and continues to monitor PDCCHs during the On period of the DRX cycle. However, no downlink assignment on a PDCCH can occur for at least the MRTT duration corresponding to the earliest unacknowledged HARQ process when all processes are stalled. Furthermore, when the network is ready to allocate DL/UL resources at the end of MRTT, it needs to wait for the On period of the DRX cycle, causing additional packet delay. This disclosure helps with the UE's power saving as well as packet delay reduction.

In case of an NTN, propagation delays can be quite long, and the number of HARQ processes required to completely fill up the RTT may be too large (e.g., hundreds). Different types of NTNs (e.g., a GEO satellite with a transparent payload and a LEO satellite with a gNB) have different MRTT. To keep the memory and processing requirements low, the number of HARQ processes may be restricted.

When all the configured HARQ processes in the downlink have transmitted their packets and have been waiting for their ACKs/NACKs. In such case, no additional packets can be sent until a HARQ ACK/NACK for the earliest process is received. This phenomenon is referred to as HARQ stalling. When a UE is operating with DRX, the UE continuously monitors PDCCHs for the duration of drx-InactivityTimer after the last DL/UL assignment is received on a PDCCH when HARQ is stalled. Such continuous PDCCH monitoring wastes UE's precious battery power. Upon expiration of drx-InactivityTimer, the UE enters DRX and continues to monitor PDCCHs during the On period of the DRX cycle. However, no downlink assignment on a PDCCH can occur for at least the MRTT duration corresponding to the earliest unacknowledged HARQ process when all DL HARQ processes are stalled and no UL assignment is planned by the gNB during the MRTT. This leads to additional waste of UE's processing power.

A similar situation exists in the uplink. An uplink assignment on a PDCCH cannot occur for at least the MRTT duration for the earliest unacknowledged HARQ process when all UL HARQ processes are stalled.

Traditional LTE and 5G phase 1 networks use up to 16 HARQ processes. A given HARQ process retransmits a packet if the HARQ process receives a negative acknowledgment (NACK) from the receiver and transmits a new packet if the HARQ process receives a positive acknowledgment (ACK) from the receiver. While one HARQ process is waiting for an ACK/NACK from the receiver, another HARQ process can send a new packet. Hence, multiple HARQ processes help achieve higher throughput by enabling transmission of multiple new packets for which ACKs/NACKs may be outstanding.

In case of an NTN, propagation delays can be quite long, and the number of HARQ processes required to completely fill up the RTT may be too large (e.g., hundreds). Different types of NTNs (e.g., a GEO satellite with a transparent payload and a LEO satellite with a gNB) have different minimum RTT (MRTT). To keep the memory and processing requirements low, the number of HARQ processes may be restricted.

Figure 12:
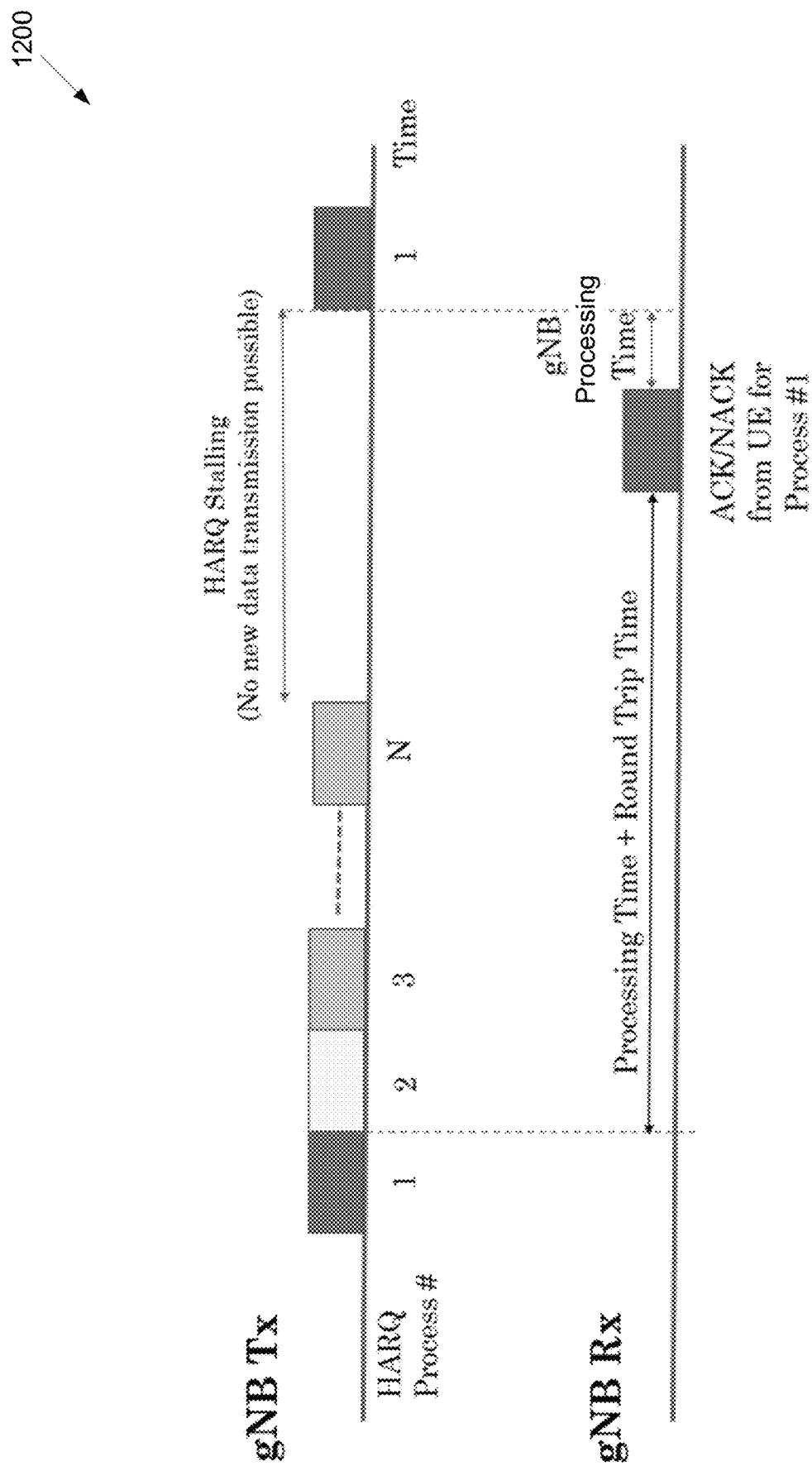
FIG. 12 illustrates an example HARQ stalling according to embodiments of the present disclosure.

FIG. 12 illustrates an example HARQ stalling 1200 according to embodiments of the present disclosure. An embodiment of the HARQ stalling 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

Consider FIG. 12 for the downlink transmission in a 4G/5G network, where all the configured "N" HARQ processes in the downlink have transmitted their packets and have been waiting for their ACKs/NACKs. In such case, no additional packets can be sent until a HARQ ACK/NACK for the earliest process is received. This phenomenon is referred to as HARQ stalling. Since the propagation delays in an NTN can be quite long, often hundreds of ms, there is a long time period of no data transfer. When a UE is operating with DRX, the UE continuously monitors PDCCHs for the duration of drx-InactivityTimer after the last DL/UL assignment is received on a PDCCH when HARQ is stalled. Such continuous PDCCH monitoring wastes UE's precious battery power.

Upon expiration of drx-InactivityTimer, the UE enters DRX and continues to monitor PDCCHs during the On period of the DRX cycle. However, no downlink assignment on a PDCCH can occur for at least the MRTT duration corresponding to the earliest unacknowledged HARQ process when all DL HARQ processes are stalled and no UL assignment is planned by the gNB during the MRTT. This leads to additional waste of UE's processing power.

While FIG. 12 illustrates the operation of the feature for the downlink, a similar situation exists in the uplink. An uplink assignment on a PDCCH cannot occur for at least the MRTT duration for the earliest unacknowledged HARQ process when HARQ is stalled in the uplink.

In one embodiment, this feature defines an explicit indicator (e.g., "NoRxOrDRX") from the eNB/gNB that asks the UE to immediately enter "No Reception" mode or DRX mode based on the eNB/gNB implementation. The eNB/gNB may use signaling such as DCI, a MAC CE, or a MAC header or subheader (e.g., a new field or even a reserved bit) to convey the "NoRxOrDRX" indicator to the UE.

If HARQ is stalled for both the downlink and the uplink, the eNB/gNB can maximize the power saving for the UE by asking the UE to immediately enter "No Reception" mode when the last DL/UL assignment associated with HARQ stalling is conveyed to the UE.

If HARQ is stalled for one link (and hence no resource assignment for that direction is feasible until MRTT timer of the earliest HARQ process expires) and no resource assignment is planned for the other link until the expiry of the earliest MRTT timer, the eNB/gNB can maximize the power saving for the UE by asking the UE to enter "No Reception" mode when the last DL/UL assignment associated with HARQ stalling is conveyed to the UE.

In one embodiment, if HARQ is stalled for one link (and hence no resource assignment for that direction is feasible until MRTT of the earliest HARQ process expires) but resource assignment is planned by the eNB/gNB for the other link, the eNB/gNB can still help the UE save power by activating DRX immediately instead of the UE waiting for drx-InactivityTimer to expire. In such case, continuous monitoring of PDCCHs while drx-InactivityTimer is running is avoided.

Figure 13:
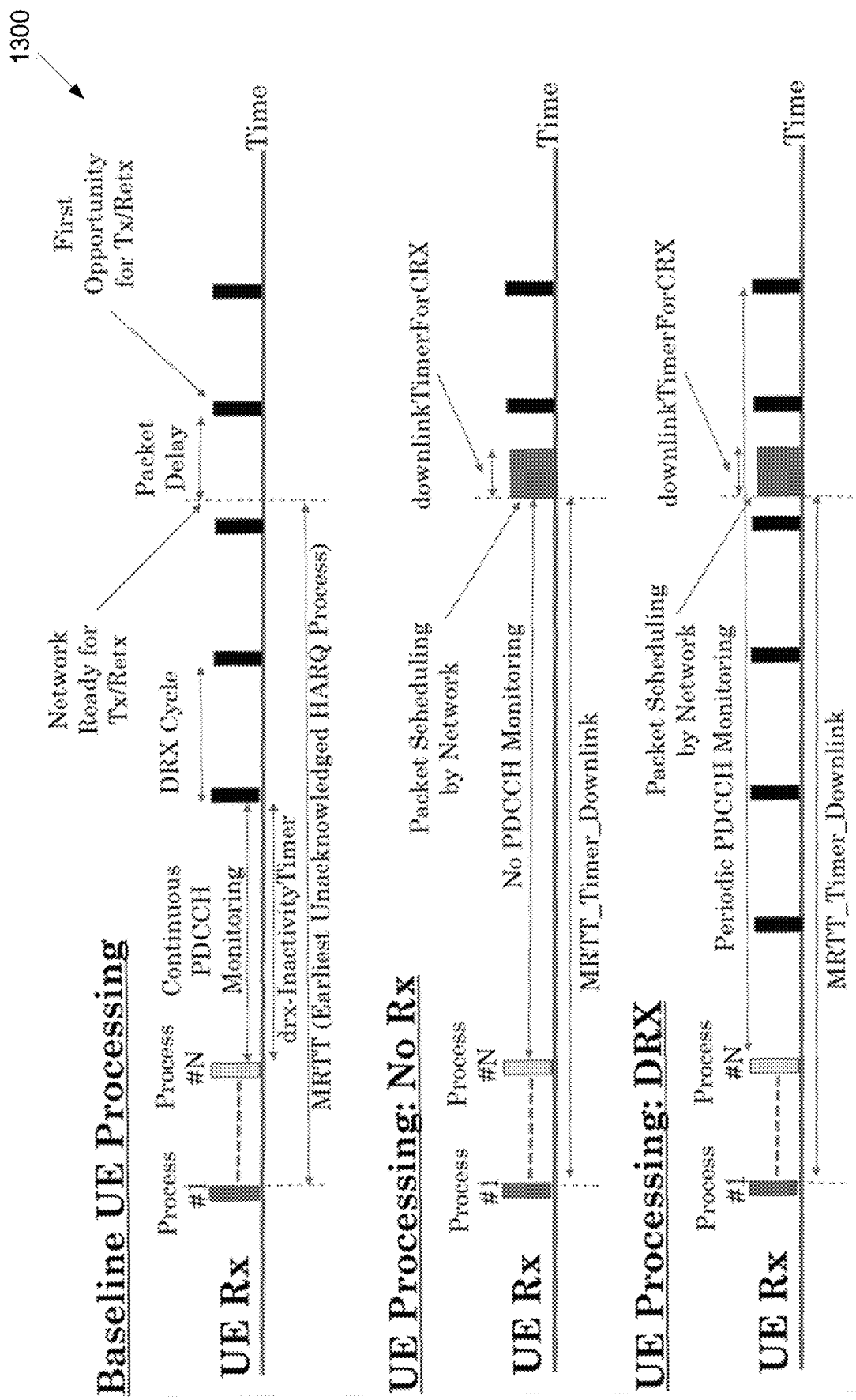
FIG. 13 illustrates an example UE power saving in the presence of HARQ stalling according to embodiments of the present disclosure.

FIG. 13 illustrates an example UE power saving 1300 in the presence of HARQ stalling according to embodiments of the present disclosure. An embodiment of the UE power saving 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

FIG. 13 illustrates how UE power is saved in "No Rx" and DRX modes in case of DL transmissions. The same principle is applicable to the uplink transmissions as well.

Upon receiving the indication to use the "No Reception" mode or the DRX mode, the UE uses the timers MRTT_Timer_Downlink, MRTT_Timer_Uplink, downlinkTimerForCRX, and uplinkTimerForCRX per HARQ process to determine when to wake up in time and how long to stay awake to receive any DL/UL assignment.

For example, the eNB/gNB may specify a downlink resource assignment for a HARQ process within the period of downlinkTimerForCRX when MRTT_Timer_Downlink expires. Similarly, the eNB/gNB may specify an uplink resource assignment for a HARQ process within the period of uplinkTimerForCRX when MRTT_Timer_Uplink expires. The UE continuously monitors PDCCHs when downlinkTimerForCRX or uplinkTimerForCRX is running for any of the HARQ processes, because the UE is in continuous reception (CRX) mode. The timers downlinkTimerForCRX and uplinkTimerForCRX give the eNB/gNB adequate time to do DL/UE resource assignment for a new transmission or packet retransmission for a given HARQ process, minimize the packet delay, and limit the amount of time the UE needs to continuously monitor PDCCHs.

If the UE had been operating in the "No Reception" mode prior to monitoring PDCCHs continuously, the UE exits "No Reception" mode, stops all HARQ stalling related timers, and enters the DRX mode when both downlinkTimerForCRX and uplinkTimerForCRX expire for all HARQ processes. For a given HARQ process, the timers downlinkTimerForCRX and uplinkTimerForCRX expire when no new DL/UL assignment occurs while the timers are running.

If the UE had been operating in DRX mode prior to monitoring PDCCHs continuously, the UE resumes normal DRX operations when both downlinkTimerForCRX and uplinkTimerForCRX expire for all HARQ processes.

The UE starts MRTT_Timer_Downlink for each process independently when a new or retransmitted packet for a given HARQ process is received. The UE wakes up in time at the expiry of MRTT_Timer_Downlink of the earliest expected HARQ process (which would be the earliest unacknowledged HARQ process) to receive a downlink resource assignment.

In case of DL HARQ stalling in FIG. 13, the UE avoids unnecessary monitoring of PDCCHs (and associated processing such as synchronization), leading to power saving for the UE. The feature also minimizes the packet delay transmission, because the network can transmit new data or retransmit old data at the expiry of MRTT_Timer_Downlink at the UE instead of the UE waiting for the On period of the DRX cycle. The UE wakes up in time to receive the DL resource assignment and associated DL transmission.

The UE starts MRTT_Timer_Uplink for each process independently when a new packet is transmitted or a packet is retransmitted. The UE wakes up in time to receive an uplink resource assignment for the earliest expected HARQ process (which would be the earliest unacknowledged HARQ process). Similar to the downlink case, this feature also minimizes the packet delay transmission, because the network can assign uplink resources at the expiry of MRTT_Timer_Uplink at the UE instead of waiting for the On period of the DRX cycle to assign UL resources.

The UE continuously monitors PDCCHs when downlinkTimerForCRX or uplinkTimerForCRX is running for any HARQ process, because the network may specify DL/UL resource assignment during these time periods. The feature also provides reactivation or resumption of the DRX when both downlinkTimerForCRX and uplinkTimerForCRX expire for all HARQ processes.

The UE starts downlinkTimerForCRX after MRTT_Timer_Downlink of the DL HARQ process expires. The UE starts uplinkTimerForCRX after MRTT_Timer_Uplink of the UL HARQ process expires.

When a UE obtains a DL/UL assignment for a given HARQ process, the UE stops and resets the related timer downlinkTimerForCRX/uplinkTimerForCRX.

The network conveys the parameters such as MRTT_Timer_Downlink, MRTT_Timer_Uplink, downlinkTimerForCRX, and uplinkTimerForCRX to the UE via suitable RRC signaling (e.g., RRC reconfiguration message in 5G and RRC Connection reconfiguration message in LTE). The network runs similar timers on the network's side so these timers coincide with the UE's timers.

PDSCH/PUSCH aggregation can be supported by this feature, and suitable adjustments to the timers provided by the features can be made if needed so that the UE is able to wake up in time to receive DL/UL resource assignments.

Figure 14:
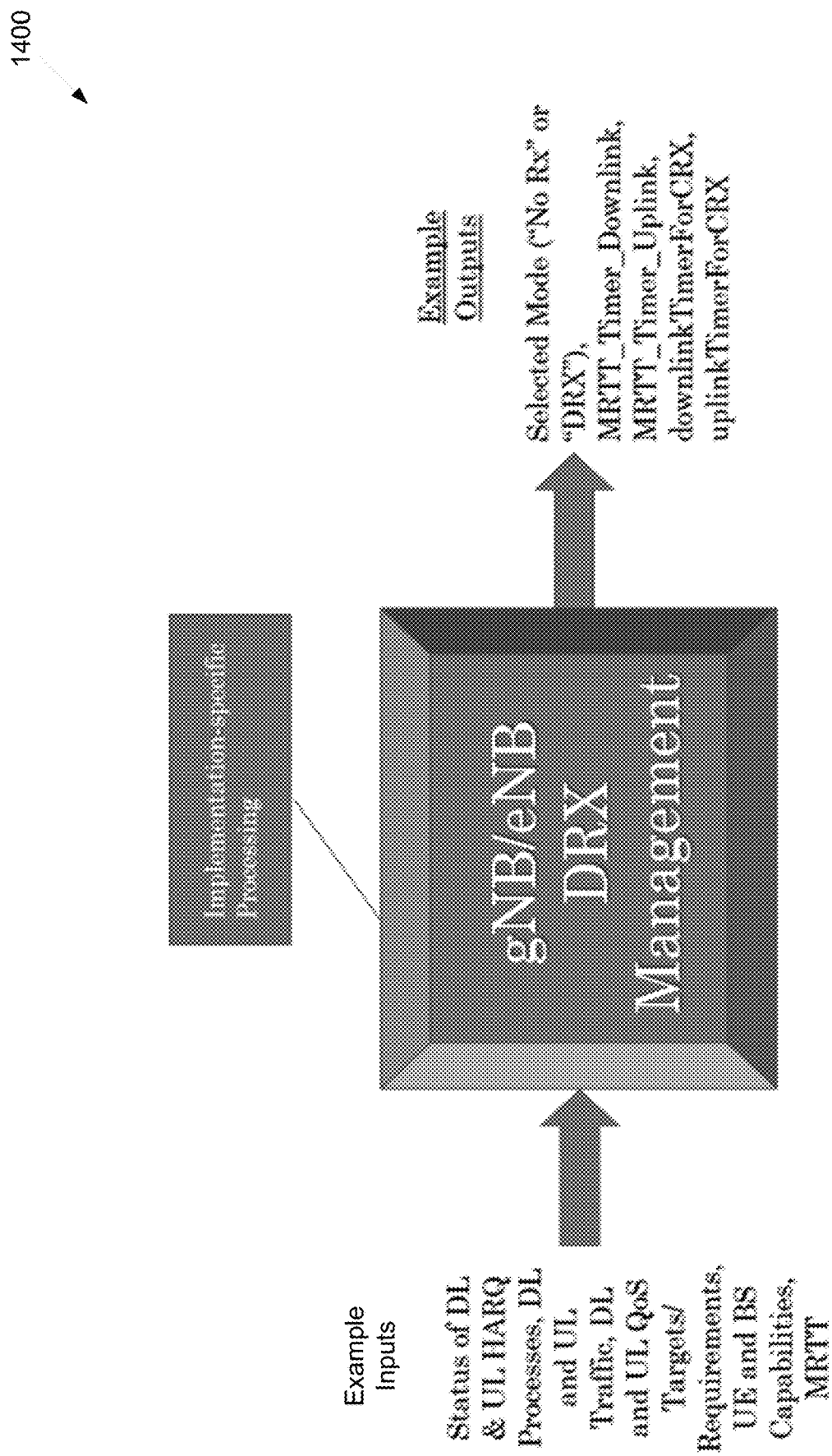
FIG. 14 illustrates an example UE power saving in the presence of HARQ stalling according to embodiments of the present disclosure.

FIG. 14 illustrates an example UE power saving 1400 in the presence of HARQ stalling according to embodiments of the present disclosure. An embodiment of the UE power saving 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

Figure 15:
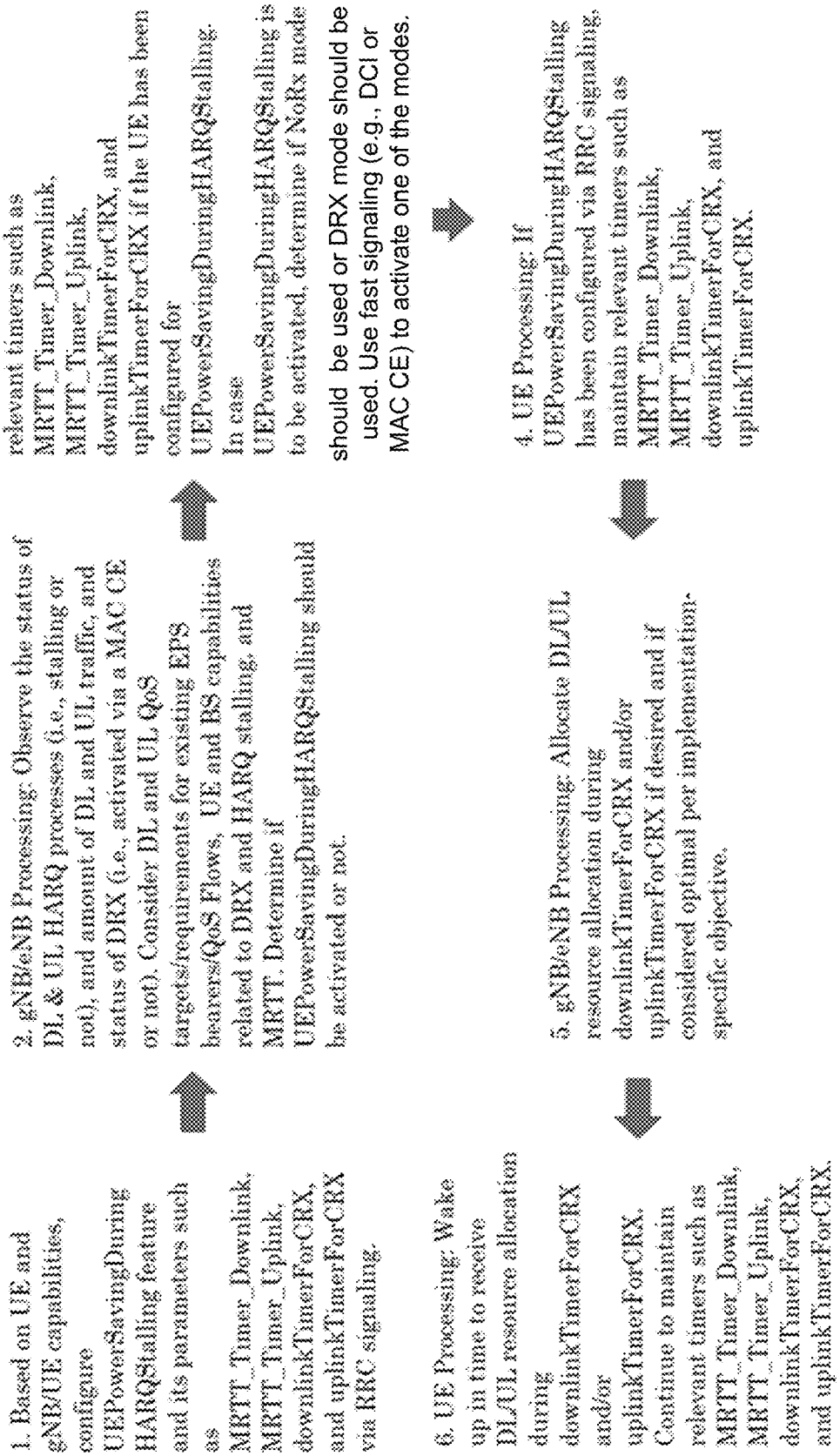
FIG. 15 illustrates an example steps of UE power saving in the presence of HARQ stalling according to embodiments of the present disclosure.

FIG. 15 illustrates an example steps of UE power saving 1500 in the presence of HARQ stalling according to embodiments of the present disclosure. An embodiment of the steps of UE power saving 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

Figure 16:
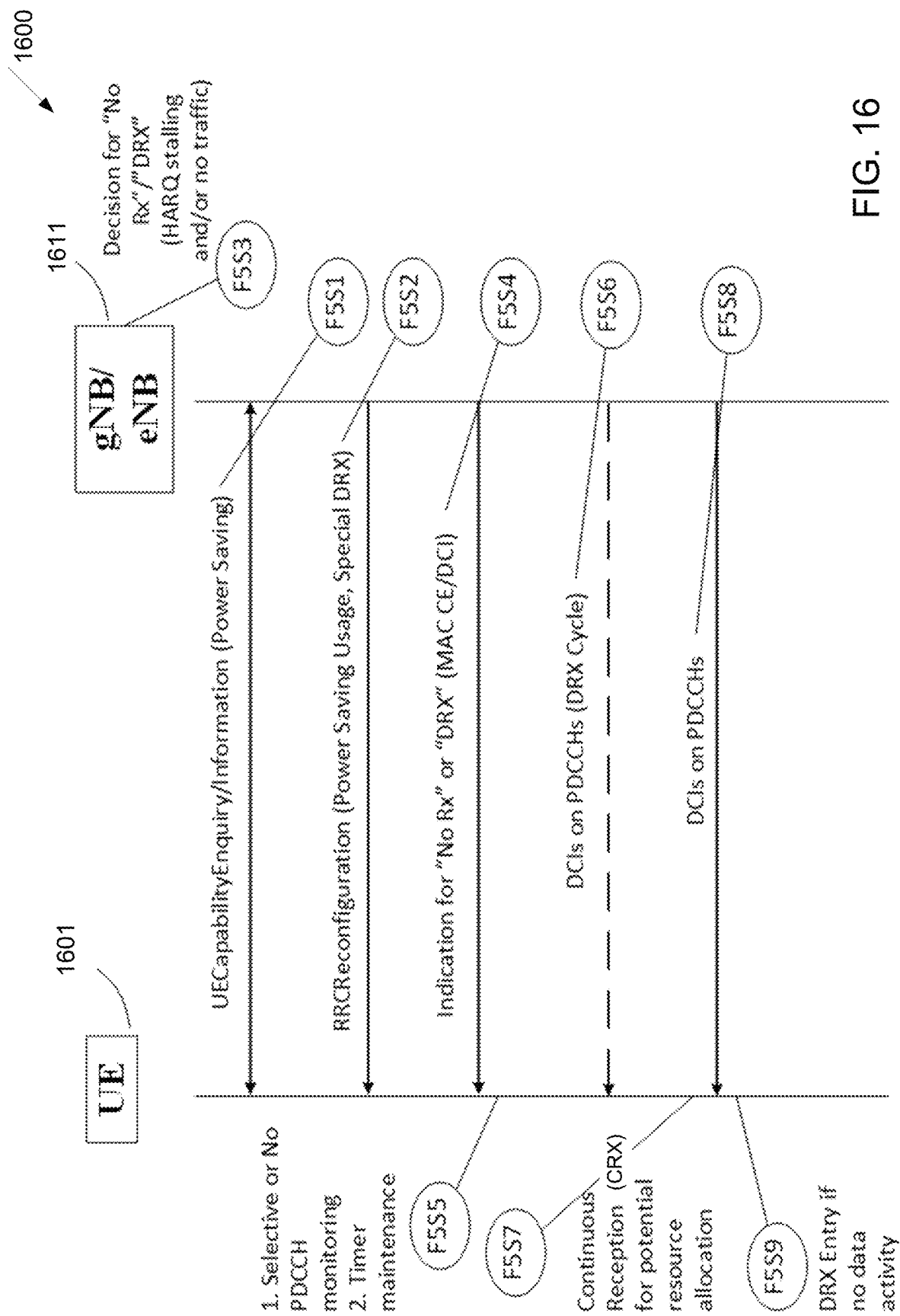
FIG. 16 illustrates a signaling flow for UE and network to support UE power saving during HARQ Stalling according to embodiments of the present disclosure.

FIG. 16 illustrates a signaling flow for UE and network 1600 to support UE power saving during HARQ Stalling according to embodiments of the present disclosure. An embodiment of the signaling flow for UE and network 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

FIG. 16 illustrates examples of embodiments of the disclosure when there is an explicit indication from the gNB/eNB to the UE about the "No Rx" or "DRX" mode to help the UE save power when (i) HARQ stalling occurs or (ii) HARQ stalling does not occur but no more resource allocation is anticipated due to the absence of traffic.

As illustrated in FIG. 16, in step F5S1, the UE and the gNB exchange UECapabilityEnquiry/UECapabilitynformation messages. In one approach, the network can ask the UE if the UE supports power saving during HARQ stalling feature. The UE, on the UE own or in response to the network's request, can inform the network if the UE supports power saving during HARQ stalling feature. In another approach, the "power saving during HARQ stalling feature" can be mandatory for the UE and in such case no capability indication is needed during this message exchange. In yet another approach, there could be a distinction between the explicit method of the "No Rx"/"DRX" modes and the implicit method of the "No Rx"/"DRX" modes. One or both of these methods may be supported by the UE and/or the network. In one approach, the network makes the determination of which method to use—the explicit method as illustrated in FIG. 16 and FIG. 17.

Figure 17:
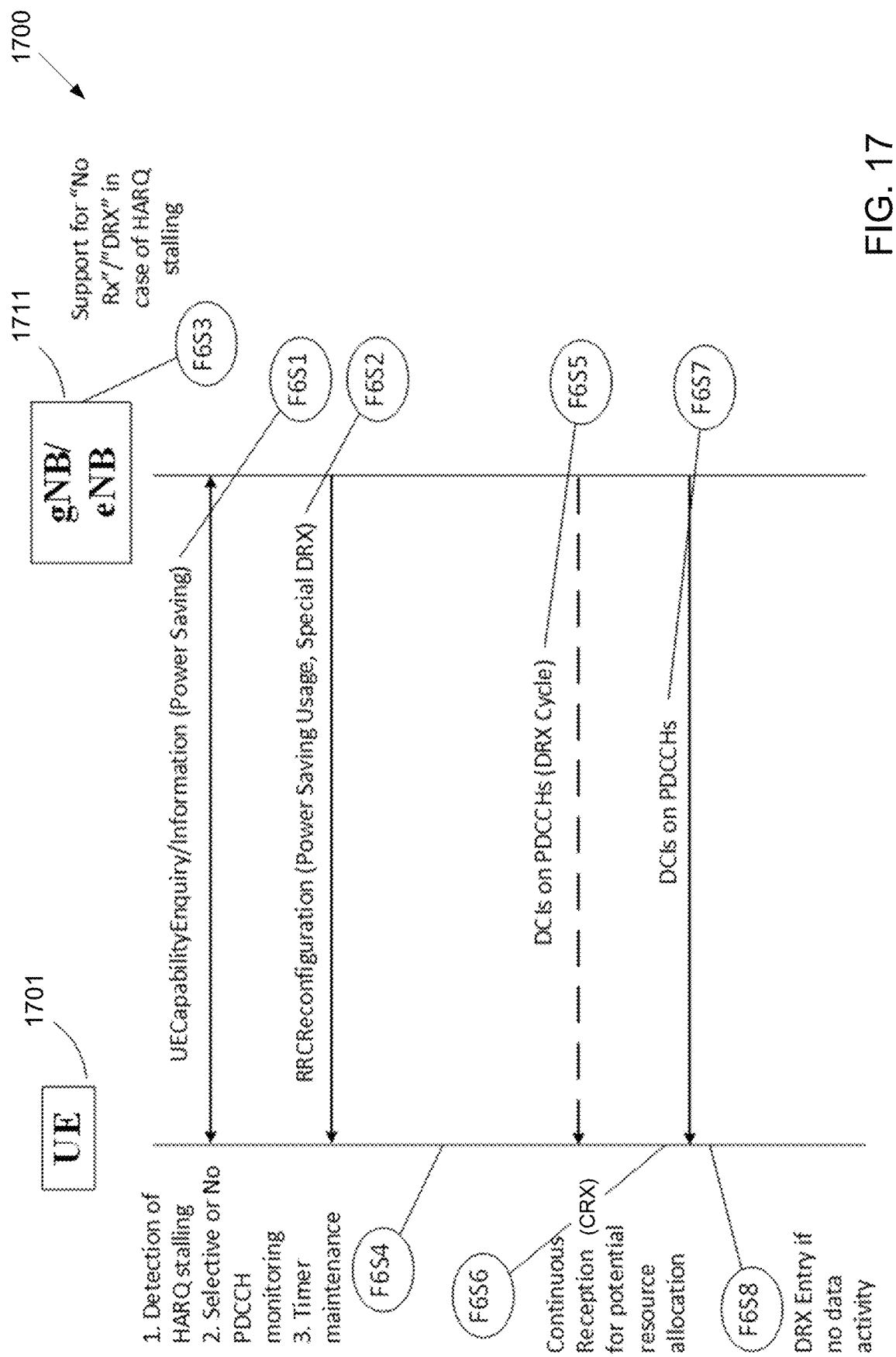
FIG. 17 illustrates another signaling flow for UE and network to support UE power saving during HARQ Stalling according to embodiments of the present disclosure.

FIG. 17 illustrates another signaling flow for UE and network 1700 to support UE power saving during HARQ Stalling according to embodiments of the present disclosure. An embodiment of the signaling flow for UE and network 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions.

As illustrated in FIG. 16, in step F5S2, the gNB configures the UE with typical DRX configurations. In an example embodiment, the network may configure the UE with different (or the same) DRX cycles to use when the HARQ stalling occurs in (i) the downlink only, (ii) the uplink only, and (iii) both the downlink and the uplink. For example, when HARQ is stalled in the downlink, the higher-layer acknowledgements (e.g., RLC in the radio protocol stack and TCP above the radio protocol stack) in the uplink may still be required or desirable. Such acknowledgments can be sent during the "On" period of a longer DRX cycle.

In step F5S3, in an example embodiment, the gNB detects if the HARQ stalling has occurred in one or both links (i.e., the uplink and the downlink). In another embodiment, the gNB may determine that no more resource allocation is possible for a given link (one or both links) although there may be some unused HARQ processes (meaning HARQ stalling has not formally occurred).

In step F5S4, in an example embodiment, the gNB sends an explicit indication to the UE to use the "No Rx" mode or "DRX" mode. Such indicator (e.g., "NoRxOrDRX") from the eNB/gNB asks the UE to immediately enter "No Reception" mode or "DRX mode" based on the eNB/gNB implementation. In one embodiment, the "No Rx" aspect of "NoRxOrDRX" means that the eNB/gNB is asking the UE to immediately enter "No Reception" mode, where there is complete absence of PDCCH monitoring for user-specific downlink assignment and uplink assignment. The "DRX" aspect of "NoRxOrDRX" means that the eNB/gNB is asking the UE to immediately enter the DRX mode, where PDCCH monitoring for user-specific downlink assignment and uplink assignment occurs during the "On" period of the DRX cycle. The eNB/gNB may use signaling such as a DCI, MAC CE, MAC header, or MAC subheader to convey the "NoRxOrDRX" indicator to the UE.

In another embodiment, for the "NoRxOrDRX" indication, the explicit indication about the "NoRx" aspect of "NoRxOrDRX" can be made specific to the link so that the UE does not need to carry out DCI processing for a given link. For example, when the DL HARQ is stalled, "NoRxForDL" can be used by the eNB/gNB to explicitly inform the UE that the UE does not need to do downlink DCI format processing. Similarly, when the UL HARQ is stalled, "NoRxForUL" can be used by the eNB/gNB to explicitly inform the UE that the UE does not need to do uplink DCI format processing.

In yet another embodiment, for the "NoRxOrDRX" indication, the explicit indication about the "DRX" aspect of "NoRxOrDRX" can be made specific to the link so that the UE does not need to carry out DCI processing for a given link. For example, when the UL HARQ is stalled, "DRXForDL" can be used by the eNB/gNB to explicitly inform the UE that the UE only needs to do downlink DCI format processing and does not need to do uplink DCI format processing. Similarly, when the DL HARQ is stalled, "DRXForDL" can be used by the eNB/gNB to explicitly inform the UE that the UE only needs to do uplink DCI format processing and does not need to do downlink DCI format processing. Furthermore, "DRXForDLAndUL" can be used by the eNB/gNB to explicitly inform the UE that the UE needs to do downlink and uplink DCI format processing during the "On" period of the DRX cycle.

In step F5S5, the UE follows carries out suitable processing such as selective monitoring of PDCCHs for any DL/UL assignments during the "On" period of the configured DRX cycle or does not monitor PDCCHs for such assignments based on the "N received from the gNB/eNB in step F5S4.

In step F5S6, the gNB/eNB may send DCIs as needed based on the factors such as the status of HARQ stalling and traffic patterns.

In step F5S7, the UE starts CRX as the relevant timer has expired due to the end of the RTT for the earliest unacknowledged HARQ process and the network may send a DL/UL assignment to the UE.

In step F5S8, the gNB/eNB may send DCIs as needed based on availability of traffic.

In step F5S9, the UE enters DRX if no assignment is specified on the DCI for a configured time period.

FIG. 17 illustrates examples of embodiments of the disclosure when there is no explicit indication from the gNB/eNB to the UE about the "No Rx" or "DRX" mode but the UE enters such modes to conserve power when HARQ stalling occurs. Most of the steps as illustrated in FIG. 17 are similar to those in FIG. 5, with the main difference being the absence of an explicit "NoRxOrDRX" indication from the gNB/eNB to the UE in FIG. 17.

As illustrated in FIG. 17, in step F6S1, the UE and the gNB exchange UECapabilityEnquiry/UECapabilitynformation messages as described for step F5S1 for FIG. 16.

In one example, the network can ask the UE if the UE supports power saving during HARQ stalling feature. The UE, on the UE owns or in response to the network's request, can inform the network if the UE supports power saving during HARQ stalling feature.

In another example, the "power saving during HARQ stalling feature" can be mandatory for the UE and in such case no capability indication is needed during this message exchange. In yet another approach, there could be a distinction between the explicit method of the "No Rx"/"DRX" modes and the implicit method of the "No Rx"/"DRX" modes. One or both of these methods may be supported by the UE and/or the network. In one approach, the network makes the determination of which method to use—the explicit method of FIG. 16 or the implicit method of FIG. 17.

In step F6S2, the gNB configures the UE with typical DRX configurations as described for step F5S2 for FIG. 16. In one embodiment, the network may configure the UE with different (or the same) DRX cycles to use when the HARQ stalling occurs in (i) the downlink only, (ii) the uplink only, and (iii) both the downlink and the uplink. For example, when HARQ is stalled in the downlink, the higher-layer acknowledgements (e.g., RLC in the radio protocol stack and TCP above the radio protocol stack) in the uplink may still be required or desirable. Such acknowledgments can be sent during the "On" period of a longer DRX cycle.

In step F6S3, in an example embodiment, the gNB takes actions according to the expected UE actions related to "No Rx" and "DRX". For example, the gNB would use HARQ processes in sequence (e.g., process 0, process 1, and so on up to the highest-numbered process). It may use a suitable DRX cycle and send suitable DCIs (e.g., uplink assignments, downlink assignments, or both) if the UE is expected to enter a DRX cycle.

In step F6S4, in an example embodiment, the UE detects the need for "No Rx" or "DRX" without any explicit indication from the gNB. In one embodiment, if HARQ RTT timer is running for all the configured number of HARQ processes, the UE skips monitoring PDCCH. In an embodiment of the disclosure, the PDCCH can be monitored during the "On" period of a suitable DRX cycle for one link when the other link is stalled.

Note that multiple granularities for the "No Rx" and "DRX" can exist as described in Step F5S4. For example, if the UE detects the resource assignment for the highest-numbered HARQ process in the downlink and does not expect any downlink assignment for a new transmission or retransmission for the earliest unacknowledged HARQ process, it can enter the "NoRxForDL" mode (meaning no DL DCI format processing may be carried out by the UE). Similarly, if the UE detects the resource assignment for the highest-numbered HARQ process in the uplink and does not expect any uplink assignment for a new transmission or retransmission for the earliest unacknowledged HARQ process, it can enter the "NoRxForUL" mode (meaning no UL DCI format processing may be carried out by the UE). Furthermore, when both "NoRxForDL" and "NoRxForUL" conditions are satisfied, the UE can enter the "No Rx" mode or the UE can stay in the DRX mode per configuration by the eNB/gNB.

In step F6S5, the gNB/eNB may send DCIs as needed based on the factors such as the status of HARQ stalling and traffic patterns.

In step F6S6, the UE starts continuous reception (CRX) (e.g., for the duration of HARQ Retransmission Timer) as the relevant timer (e.g., HARQ RTT Timer) has expired due to the end of the RTT for the earliest unacknowledged HARQ process and the network may send a DL/UL assignment to the UE.

In step F6S7, the gNB/eNB may send DCIs as needed based on availability of traffic.

In step F5S8, the UE enters DRX if no assignment is specified on the DCI for a configured time period.

In another embodiment, for both FIG. 16 and FIG. 17, the support for this feature can be conveyed by using a parameter such as SupportForPowerSavingDuringHARQStallingInDRX (e.g., "1" if the feature is supported and "0" if the feature is not supported and vice versa). This can be a UE capability parameter. If the feature is mandatory for the UE and the network, such configuration or capability exchange is not needed. The feature may be configured via RRC configuration/reconfiguration like DRX configuration.

In one embodiment, a way to activate the feature is by including a flag in a MAC CE that controls activation of DRX. Furthermore, a distinction may also be made regarding the use of the explicit method or the implicit method illustrated in FIG. 16 and FIG. 17, respectively. In another embodiment of activating the feature, a MAC header or subheader can be used to activate the feature.

In another embodiment, for both FIG. 16 and FIG. 17, the existing timers such as drx-HARQ-RTT-TimerDL, drx-HARQ-RTT-TimerUL, drx-RetransmissionTimerDL, drx-RetransmissionTimerUL can be reused by establishing specific relationships to MRTT_Timer_Downlink, MRTT_Timer_Uplink, downlinkTimerForCRX, and uplinkTimerForCRX. For example, drx-HARQ-RTT-TimerDL and a certain processing time (i.e., difference between the packet reception instant and the HARQ ACK/NACK transmission instant) can be added to determine MRTT_Timer_Downlink. In another example, MRTT_Timer_Uplink can be set to drx-HARQ-RTT-TimerUL. In another example, downlinkTimerForCRX can be set to drx-RetransmissionTimerDL and upinkTimerForCRX can be set to drx-RetransmissionTimerUL.

In one embodiment, the mechanism used for the activation can also be used for deactivation of this power-saving feature. For example, the bit value of "1" may mean activation and the bit value of "0" may mean deactivation (or vice versa).

In one example, for UE power saving (absence of PDCCH monitoring), when the gNB/eNB asks the UE to operate in the "No Rx" mode, absolutely no PDCCH monitoring occurs, leading to significant savings in UE power.

In one example, for UE power saving (minimal PDCCH monitoring), when the gNB/eNB asks the UE to operate in the "DRX" mode, continuous PDCCH monitoring does not occur during drx-InactivityTimer and periodic PDCCH monitoring occurs during the On period of the DRX cycle, leading to savings in UE power.

In one example, for reduced packet delay, since the network can assign the resources immediately upon the MRTT instead of waiting for the On period of the DRX cycle, packet delay is minimized. Considering extremely long propagation delays (e.g., hundreds of milliseconds for a GEO-based NTN), any reduction in packet delays would lead to enhanced user experience.

In one example, for flexibility of gNB/eNB design, since the feature lets the gNB/eNB choose the type of mode, "No Rx" vs. DRX, the gNB/eNB can make the decision considering a variety of implementation-specific criteria. This provides flexibility to the gNB/eNB design.

Figure 18:
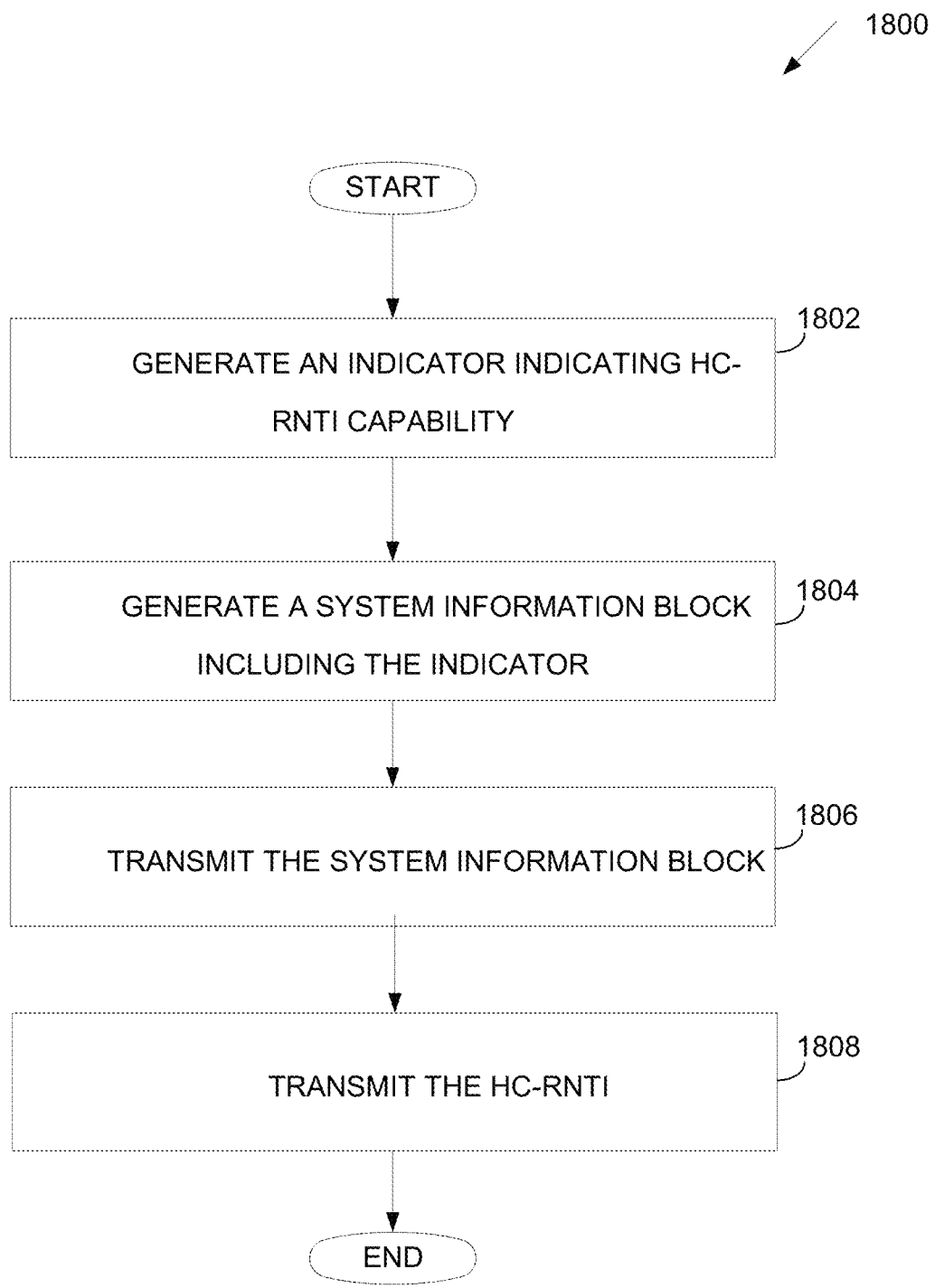
FIG. 18 illustrates a flowchart of a method for flexible high capacity-radio network temporary identifier according to embodiments of the present disclosure.

FIG. 18 illustrates a flowchart of a method 1800 for flexible high capacity-radio network temporary identifier according to embodiments of the present disclosure, as may be performed by a BS (e.g., 101-103 as illustrated in FIG. 1). An embodiment of the method 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions.

As illustrated in FIG. 18, the method 1800 begins at step 1802. In step 1802, a BS generates an indicator indicating that the BS is capable of supporting an HC-RNTI, wherein a size of the HC-RNTI is based on a configurable granularity.

Subsequently, the BS in step 1804 generates a system information block including the indicator and information indicating the size of the HC-RNTI.

Next, the BS in step 1806 transmits, to a UE, the system information block.

Finally, the BS in step 1808 transmits, to the UE, the HC-RNTI, wherein the HC-RNTI is allocated to the UE.

In one embodiment, the BS transmits, to the UE, an RA message including the HC-RNTI allocated to the UE and receives, from the UE, an uplink signal including information for traffic characteristics.

In one embodiment, the BS transmits the HC-RNTI using an RRC signaling message, a PHY layer signaling, or an MAC layer signaling. In such embodiment, the configurable granularity is based on a capacity of the BS and traffic characteristics received from a plurality of UEs belongs to the BS in order to reduce a signaling overhead at least one of at a PHY layer or at a MAC layer.

In one embodiment, the BS receives, from the UE, UE capability information, identifies, based on the UE capability information, a scheduling scheme to transmit user traffic during a handover operation, the scheduling scheme comprising a dynamic scheduling scheme or a configured scheduling scheme, and transmits, to the UE, the scheduling scheme.

In such embodiment, the dynamic scheduling scheme includes an immediate dynamic scheduling scheme such that a data transmission and reception between the BS and the UE is performed based on a DC) format after the UE receives an RRC reconfiguration message carrying a handover command or a delayed dynamic scheduling scheme such that the data transmission and reception between the BS and the UE is performed based on a DCI format after the UE receives an RAR message from a target cell for the handover operation.

In such embodiment, the configured scheduling scheme includes an immediate configured scheduling scheme such that a data transmission and reception between the BS and the UE is performed after the UE receives the RRC reconfiguration message carrying the handover command or a delayed configured scheduling scheme such that the data transmission and reception between the BS and the UE is performed after the UE receives the RAR message from the target cell for the handover operation.

In one embodiment, the BS receives, from the UE, a measurement report message including an uplink buffer status report or the measurement report message along with the uplink buffer status report, determines whether to use an intra-handover user traffic transfer based on the uplink buffer status report and a downlink buffer status for the UE, generates the HC-RNTI for the UE in a target cell, and transmits, to the UE, the HC-RNTI during a handover operation.

In one embodiment, the BS generates a request indicator requesting the UE to change a reception mode of the UE when a HARQ stalling occurs, the reception mode of the UE comprising a no reception mode or a DRX mode, and transmits, to the UE, the request indicator using a DCI or a MAC CE.

In one embodiment, the BS, after a condition for at least one of a no reception mode or a DRX mode is satisfied for the UE experiencing HARQ stalling, avoids allocation of resources for at least one of a downlink transmission or an uplink transmission for the UE experiencing the HARQ stalling.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication system, the BS comprising:
   a processor configured to:
      generate an indicator indicating that the BS is capable of supporting a high-capacity radio network temporary identifier (HC-RNTI), wherein a size of the HC-RNTI is based on a configurable granularity; and
      generate a system information block including the indicator and information indicating the size of the HC-RNTI; and
   a transceiver operably connected to the processor, the transceiver configured to:
      transmit, to a user equipment (UE), the system information block; and
      transmit, to the UE, the HC-RNTI, wherein the HC-RNTI is allocated to the UE.

2. The BS of claim 1, wherein the transceiver is further configured to:
   transmit, to the UE, a random access response (RAR) message including the HC-RNTI allocated to the UE; and
   receive, from the UE, an uplink signal including information for traffic characteristics.

3. The BS of claim 1, wherein:
   the transceiver is further configured to transmit the HC-RNTI using a radio resource control (RRC) signaling message, a physical (PHY) layer signaling, or a medium access control (MAC) layer signaling; and
   the configurable granularity is based on a capacity of the BS and traffic characteristics received from a plurality of UEs belongs to the BS in order to reduce a signaling overhead at least one of at a PHY layer or at a MAC layer.

4. The BS of claim 1, wherein:
   the transceiver is further configured to receive, from the UE, UE capability information;
   the processor is further configured to, based on the UE capability information, identify a scheduling scheme to transmit user traffic during a handover operation, the scheduling scheme comprising a dynamic scheduling scheme or a configured scheduling scheme; and
   the transceiver is further configured to transmit, to the UE, the scheduling scheme.

5. The BS of claim 4, wherein:
   the dynamic scheduling scheme includes:
      an immediate dynamic scheduling scheme such that a data transmission and reception between the BS and the UE is performed based on a downlink control information (DCI) format after the UE receives an RRC reconfiguration message carrying a handover command, or
      a delayed dynamic scheduling scheme such that the data transmission and reception between the BS and the UE is performed based on a DCI format after the UE receives an RAR message from a target cell for the handover operation; and
   the configured scheduling scheme includes:
      an immediate configured scheduling scheme such that a data transmission and reception between the BS and the UE is performed after the UE receives the RRC reconfiguration message carrying the handover command, or
      a delayed configured scheduling scheme such that the data transmission and reception between the BS and the UE is performed after the UE receives the RAR message from the target cell for the handover operation.

6. The BS of claim 1, wherein:
   the transceiver is further configured to receive, from the UE, a measurement report message including an uplink buffer status report or the measurement report message along with the uplink buffer status report;
   the processor is further configured to:
      determine whether to use an intra-handover user traffic transfer based on the uplink buffer status report and a downlink buffer status for the UE; and
      generate the HC-RNTI for the UE in a target cell, and
   the transceiver is further configured to transmit, to the UE, the HC-RNTI during a handover operation.

7. The BS of claim 1, wherein:
   the processor is further configured to generate a request indicator requesting the UE to change a reception mode of the UE when a hybrid automatic repeat request (HARD) stalling occurs, the reception mode of the UE comprising a no reception mode or a discontinuous reception (DRX) mode; and
   the transceiver is further configured to transmit, to the UE, the request indicator using a DCI or a MAC control element (MAC CE).

8. The BS of claim 1, wherein, after a condition for at least one of a no reception mode or a DRX mode is satisfied for the UE experiencing HARQ stalling, the processor is further configured to avoid allocation of resources for at least one of a downlink transmission or an uplink transmission for the UE experiencing the HARQ stalling.

9. A user equipment (UE) in a wireless communication system, the UE comprising:
   a transceiver configured to receive, from a base station (BS), a system information block including an indicator and information indicating a size of a high-capacity radio network temporary identifier (HC-RNTI), wherein the size of the HC-RNTI is based on a configurable granularity; and a processor operably connected to the transceiver, the processor configured to identify the indicator indicating that the BS is capable of supporting the HC-RNTI, and the size of the HC-RNTI,
wherein the transceiver is further configured to receive, from the BS, the HC-RNTI, wherein the HC-RNTI is allocated to the UE.

10. The UE of claim 9, wherein the transceiver is further configured to:
receive, from the BS, a random access response (RAR) message including the HC-RNTI allocated to the UE; and
transmit, to the BS, an uplink signal including information for traffic characteristics.

11. The UE of claim 9, wherein:
the transceiver is further configured to receive the HC-RNTI using a radio resource control (RRC) signaling message, a physical (PHY) layer signaling, or a medium access control (MAC) layer signaling; and
the configurable granularity is based on a capacity of the BS and traffic characteristics received from a plurality of UEs belongs to the BS in order to reduce a signaling overhead at least one of at a PHY layer or at a MAC layer.

12. The UE of claim 9, wherein the transceiver is further configured to:
transmit, to the BS, UE capability information;
receive, from the BS, a scheduling scheme corresponding to the UE capability information to receive user traffic during a handover operation, the scheduling scheme comprising a dynamic scheduling scheme or a configured scheduling scheme; and
wherein:
the dynamic scheduling scheme includes:
an immediate dynamic scheduling scheme such that a data transmission and reception between the BS and the UE is performed based on a downlink control information (DCI) format after the UE receives an RRC reconfiguration message carrying a handover command, or
a delayed dynamic scheduling scheme such that the data transmission and reception between the BS and the UE is performed based on a DCI format after the UE receives an RAR message from a target cell for the handover operation, and
the configured scheduling scheme includes:
an immediate configured scheduling scheme such that a data transmission and reception between the BS and the UE is performed after the UE receives the RRC reconfiguration message carrying the handover command, or
a delayed configured scheduling scheme such that the data transmission and reception between the BS and the UE is performed after the UE receives the RAR message from the target cell for the handover operation.

13. A method of a base station (BS) a wireless communication system, the method comprising:
generating an indicator indicating that the BS is capable of supporting a high-capacity radio network temporary identifier (HC-RNTI), wherein a size of the HC-RNTI is based on a configurable granularity;
generating a system information block including the indicator and information indicating the size of the HC-RNTI;
transmitting, to a user equipment (UE), the system information block; and transmitting, to the UE, the HC-RNTI, wherein the HC-RNTI is allocated to the UE.

14. The method of claim 13, further comprising:
transmitting, to the UE, a random access response (RAR) message including the HC-RNTI allocated to the UE; and
receiving, from the UE, an uplink signal including information for traffic characteristics.

15. The method of claim 13, further comprising transmitting the HC-RNTI using a radio resource control (RRC) signaling message, a physical (PHY) layer signaling, or a medium access control (MAC) layer signaling,
wherein the configurable granularity is based on a capacity of the BS and traffic characteristics received from a plurality of UEs belongs to the BS in order to reduce a signaling overhead at least one of at a PHY layer or at a MAC layer.

16. The method of claim 13, further comprising:
receiving, from the UE, UE capability information;
identifying, based on the UE capability information, a scheduling scheme to transmit user traffic during a handover operation, the scheduling scheme comprising a dynamic scheduling scheme or a configured scheduling scheme; and
transmitting, to the UE, the scheduling scheme.

17. The method of claim 16, wherein:
the dynamic scheduling scheme includes:
an immediate dynamic scheduling scheme such that a data transmission and reception between the BS and the UE is performed based on a downlink control information (DCI) format after the UE receives an RRC reconfiguration message carrying a handover command, or
a delayed dynamic scheduling scheme such that the data transmission and reception between the BS and the UE is performed based on a DCI format after the UE receives an RAR message from a target cell for the handover operation; and
the configured scheduling scheme includes:
an immediate configured scheduling scheme such that a data transmission and reception between the BS and the UE is performed after the UE receives the RRC reconfiguration message carrying the handover command, or
a delayed configured scheduling scheme such that the data transmission and reception between the BS and the UE is performed after the UE receives the RAR message from the target cell for the handover operation.

18. The method of claim 13, further comprising:
receiving, from the UE, a measurement report message including an uplink buffer status report or the measurement report message along with the uplink buffer status report;
determining whether to use an intra-handover user traffic transfer based on the uplink buffer status report and a downlink buffer status for the UE;
generating the HC-RNTI for the UE in a target cell; and
transmitting, to the UE, the HC-RNTI during a handover operation.

19. The method of claim 13, further comprising:
generating a request indicator requesting the UE to change a reception mode of the UE when a hybrid automatic repeat request (HARQ) stalling occurs, the reception mode of the UE comprising a no reception mode or a discontinuous reception (DRX) mode; and transmitting, to the UE, the request indicator using a DCI or a MAC control element (MAC CE).

20. The method of claim 13, further comprising, after a condition for at least one of a no reception mode or a DRX mode is satisfied for the UE experiencing HARQ stalling, avoiding allocation of resources for at least one of a downlink transmission or an uplink transmission for the UE experiencing the HARQ stalling.

\* \* \* \* \*